US010645649B2

(12) United States Patent
Qi et al.

(10) Patent No.: US 10,645,649 B2
(45) Date of Patent: May 5, 2020

(54) TERMINAL DEVICE, BASE STATION, WIRELESS TELECOMMUNICATIONS SYSTEM AND METHODS FOR TRANSITIONING BETWEEN TWO MODES OF OPERATION

(71) Applicant: SONY CORPORATION, Tokyo (JP)

(72) Inventors: Yinan Qi, Weybridge (GB); Atta Ul Quddus, Weybridge (GB); Muhammad Ali Imran, Weybridge (GB); Hideji Wakabayashi, Basingstoke (GB); Jussi Tapani Kahtava, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 15/309,048

(22) PCT Filed: May 11, 2015

(86) PCT No.: PCT/EP2015/060379
§ 371 (c)(1),
(2) Date: Nov. 4, 2016

(87) PCT Pub. No.: WO2015/173197
PCT Pub. Date: Nov. 19, 2015

(65) Prior Publication Data
US 2017/0078963 A1    Mar. 16, 2017

(30) Foreign Application Priority Data

May 14, 2014    (EP) ..................................... 14168361

(51) Int. Cl.
*H04W 52/02*    (2009.01)
*H04W 68/02*    (2009.01)
(Continued)

(52) U.S. Cl.
CPC ......... *H04W 52/0216* (2013.01); *H04W 4/70* (2018.02); *H04W 52/0229* (2013.01);
(Continued)

(58) Field of Classification Search
CPC . H04W 52/02; H04W 52/0216; H04W 68/00; H04W 72/0413; H04W 76/048;
(Continued)

(56) References Cited

U.S. PATENT DOCUMENTS

2004/0254980 A1* 12/2004 Motegi ................. H04W 68/00
709/203
2009/0201843 A1* 8/2009 Wang ................ H04W 52/0216
370/311
(Continued)

FOREIGN PATENT DOCUMENTS

WO    WO 2013/170733 A1    11/2013

OTHER PUBLICATIONS

International Search Report dated Jul. 30, 2015 in PCT/EP215/060379 filed May 11, 2015.
(Continued)

*Primary Examiner* — Habte Mered
*Assistant Examiner* — Prince A Mensah
(74) *Attorney, Agent, or Firm* — Xsensus LLP

(57) ABSTRACT

A method of operating a terminal device in a wireless telecommunications system which, during a mode transition state, supports a first mode of operation in which the terminal device does not communicate with the wireless telecommunications system and a second mode of operation in which the terminal device does communicate with the wireless telecommunications system, the method including: transitioning from the first mode of operation to the second
(Continued)

mode of operation at the expiration of a time period whereby the time period is defined by the data traffic pattern to the terminal device.

19 Claims, 19 Drawing Sheets

(51) Int. Cl.
      H04W 4/70      (2018.01)
      H04W 76/28     (2018.01)
      H04W 88/06     (2009.01)
(52) U.S. Cl.
      CPC ........... *H04W 68/02* (2013.01); *H04W 76/28* (2018.02); *H04W 88/06* (2013.01); *Y02D 70/00* (2018.01); *Y02D 70/1242* (2018.01); *Y02D 70/1262* (2018.01); *Y02D 70/21* (2018.01); *Y02D 70/24* (2018.01)
(58) Field of Classification Search
      CPC ... H04W 4/70; H04W 52/0229; H04W 68/02; H04W 76/28; H04W 88/06
      See application file for complete search history.

(56) References Cited

U.S. PATENT DOCUMENTS

| | | | | |
|---|---|---|---|---|
| 2009/0325533 | A1* | 12/2009 | Lele | G06F 1/3209 455/343.1 |
| 2012/0120843 | A1 | 5/2012 | Anderson et al. | |
| 2012/0207069 | A1 | 8/2012 | Xu et al. | |
| 2013/0194991 | A1* | 8/2013 | Vannithamby | H04W 4/70 370/311 |
| 2013/0250828 | A1* | 9/2013 | Chou | H04W 72/0413 370/311 |
| 2013/0301500 | A1* | 11/2013 | Koc | H04W 4/90 370/311 |
| 2014/0119310 | A1* | 5/2014 | Shimizu | H04L 5/0053 370/329 |
| 2015/0009816 | A1* | 1/2015 | Hsu | H04W 28/0221 370/230.1 |
| 2015/0063240 | A1* | 3/2015 | Worrall | H04W 72/0486 370/329 |

OTHER PUBLICATIONS

ETSI TS 122 368 V10.5.0 (Jul. 2011) , Digital cellular telecommunications system (Phase 2+); Universal Mobile Telecommunications System (UMTS);LTE; Service requirements for Machine-Type Communications (MTC);Stage 1 Release 10, 2011, 18 pages.
Hard Holma, et al., "LTE for UMTS OFDMA and SC-FDMA based radio access", System Architecture Based on 3GPP SAE, John Wiley and Sons, 2009, 4 pages.
Ericsson, "Details of MAC DRX Control", TSG-RAN WG-2 Meeting #61, R2-080934, Feb. 11-14, 2008, 5 pages.
Shantanu Kangude, "Lecture: LTE Scheduling and DRX", EETS 8316, Wireless networks 2013, online at http://lyle.smu.edu/~skangude/eets8316.html. 1 page.
ETSI TS 136 331 V11.3.0 (Apr. 2013), LTE; Evolved Universal Terrestrial Radio Access (E-UTRA);Radio Resource Control (RRC); Protocol specification 3GPP TS 36.331 version 11.3.0 Release 1, 2013, Technical Specification, pp. 348.
ETSI TS 136 321 V11.2.0 (Apr. 2013), LTE; Evolved Universal Terrestrial Radio Access (E-UTRA);Medium Access Control (MAC) protocol specification (3GPP TS 36.321 version 11.2.0 Release 11) 58 pages.
Stefanie Sesia, et al., LTE The UMS Long Term Evolution from Theory to Practice, Second edition, Wiley 2011, 3 pages.
3GPP TR36.888, V2.0.0, 3rd Generation Partnership Project; Technical Specification Group Radio Access Network; Study on provision of low-cost MTC UEs based on LTE;(Release 11), Jun. 2012, 43 pages.
MIT online course, Chapter 2 Poisson Processes, 6.262 Discrete Stochastic Processes, 2011, online at http://ocw.mit.edu/courses/electrical-engineering-and-computer-science/6-262-discrete-stochastic-processes-spring-2011/course-notes/MIT6_262S11_chap02.pdf. 35 pages.
3GPP TR 23.887 V12.0.0, Technical Report, $3^{rd}$ Generation Partnership Project; Technical Specification Group Service and System Aspects; Study on Machine-Type Communications (MTC) and other mobile data applications communications enhancements, Release 12, 2013, XP050906655,152 pages.
Sony , "Power Saving State for MTC and other mobile data application", 3GPP TSG RAN WG2 #83, Aug. 2013, R2-132644, Agenda Item:5.2.1, XP050718451, 3 pages.
3GPP TR 23.888, V1.2.0, 3rdGeneration Partnership Project; Technical Specification Group Services and System Aspects; "System improvements for Machine-Type Communications (MTC)," V1.2.0, Apr. 2011, 111 pages.
C2Power, Cognitive Radio and Cooperative Strategies for POWER saving in multi-standard wireless device, 2016, 2 pages, http://www.ict-c2power.eu/.
3GPP TR 23.888, V2.0.0, 3rdGeneration Partnership Project; Technical Specification Group Services and System Aspects; "System improvements for Machine-Type Communications (MTC)," Release 11, Aug. 2012, 166 pages.
3GPP TR 22.368, V12.2.0, 3rd Generation Partnership Project; Technical Specification Group Services and System Aspects; Service requirements for Machine-Type Communications (MTC), stage1, Release 12, V12.2.0, Mar. 2013, 24 pages.
3GPP TR 23.887, V1.0.0 2013, 3rd Generation Partnership Project; Technical Specification Group Services and System Aspects; Machine-Type and other Mobile Data Applications Communications Enhancements, 2013, 133 pages.
Riccardo Fedrizzi et al., "Cooperative Short Range Routing for Energy Saving in Multi-Interface Wreless Networks," in Proc. of VTC2013, Dresden, Jun. 2013, 5 pages.
Antti.P Miettinen, et al., "Energy efficiency of mobile clients in cloud computing," in Proc. of HotCloud'10, 2010, pp. 4-10.
Zhang, Limin, et al., "Energy-efficient task scheduling algorithm for mobile terminal," in Proc. of IET International Conference on Wireless, Mobile and Multimedia Networks, Nov. 2006, Date Added to IEEE Xplore Aug. 7, 2009, 2 pages.
Xiao Ma, et al., "Energy optimizations for mobile terminals via computation offloading", IEEE, Date Added to IEEE Xplore Feb. 7, 2013, Dec. 2012, 2 pages.
Ali T. Koc, et al., "Optimizing DRX Configuration to Improve Battery Power Saving and Latency of Active Mobile Application over LTE-A Network", 2013 IEEE, Wireless Communications and Networking Conference, (WCNC): MAC, 6 pages.
3GPP TS 136.331, V10.7.0, 2012, Evolved Universal Terrestrial Radio Access (E-UTRA); Radio Resource Control, (RRC); Protocol specification (3GPP TS 36.331 version 10.7.0 Release 10), 2012, 307 pages.
Share Technote, online at http://www.sharetechnote.com/html/MAC_LTE.html#DRX, 2016, chrome, 13 pages.
LTE in Wireless, LTE in Wireless: Paging In LTE, online at http://lteinwireless.blogspot.co.uk/2012/12/paging-in-lte.html, 2016, 5 pages.
Lauro, Expert Opinion, RRC connection Release, LTE University, online at http://lteuniversity.com/get_trained/expert_opinion1/b/lauroortigoza/archive/2013/12/18/rrc-connection-release.aspx., 2013, 4 pages.

\* cited by examiner

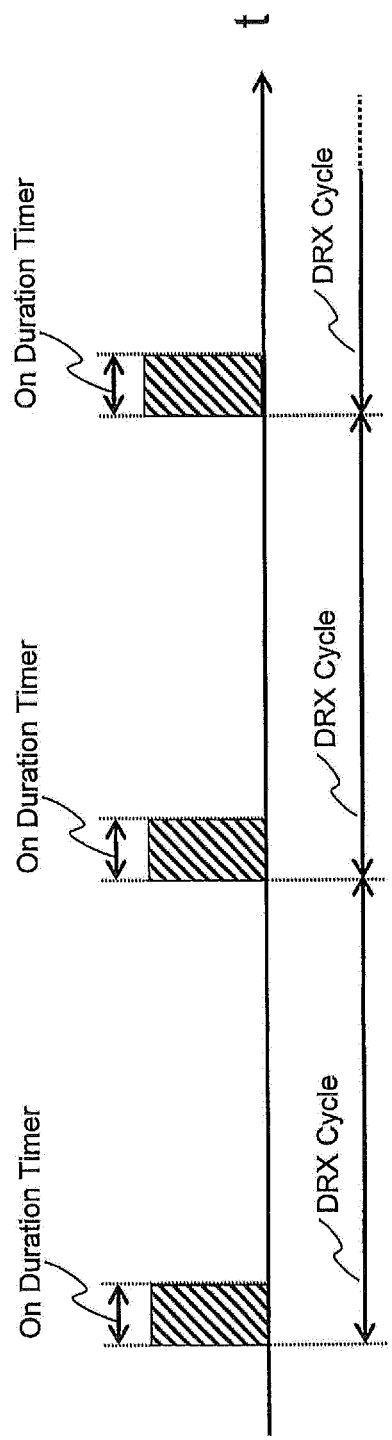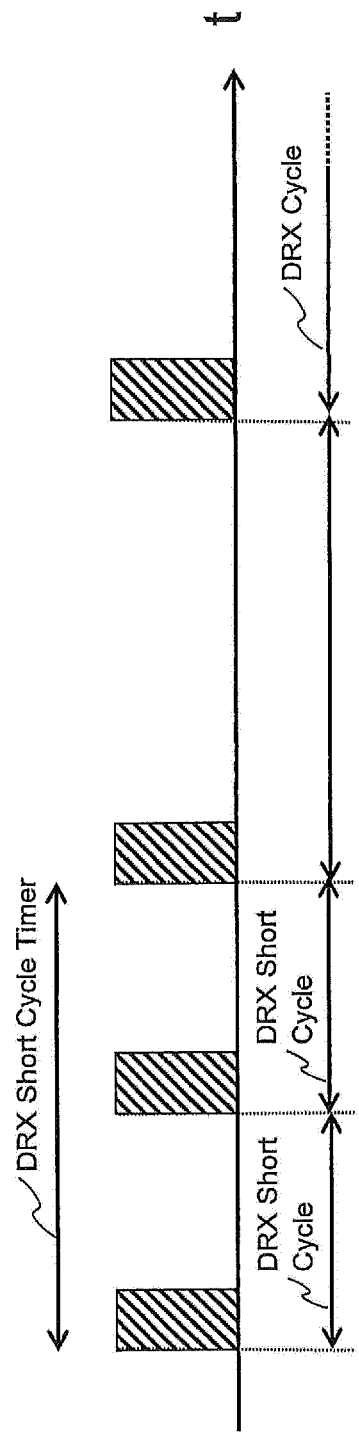
FIG. 4
FIG. 5

TERMINAL DEVICE, BASE STATION, WIRELESS TELECOMMUNICATIONS SYSTEM AND METHODS FOR TRANSITIONING BETWEEN TWO MODES OF OPERATION

CROSS-REFERENCE TO RELATED APPLICATIONS

The present application is based on PCT filing PCT/EP2015/060379 filed May 11, 2015, and claims priority to European Patent Application 14 168 361.5, filed in the European Patent Office on May 14, 2014, the entire contents of each of which being incorporated herein by reference.

BACKGROUND

Field of the Disclosure

The present invention relates to a method, terminal device, base station, wireless telecommunications system and method therefor Description of the Related Art The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices or MTC UEs) communicating small amounts of data on a relatively infrequent basis. Examples include so-called smart meters which, for example, might be located in a customer's house and periodically transmit information back to a central MTC server relating to the customer's consumption of a utility, such as gas, water, electricity and so on. Further information on characteristics of MTC-type devices can be found, for example, in the 30 corresponding standards, such as ETSI TS 122 368 V10.530 (2011-07)/3GPP TS 22.368 version 10.5.0 Release 10) [1].

Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

Unlike a conventional third or fourth generation terminal device (such as a smartphone), an MTC-type terminal is preferably relatively simple and inexpensive and able to operate with relatively low power consumption. For example, it may often be the case that an MTC-type terminal is required to operate for an extended period of time without an external source of power. However, whilst it can be convenient for an MTC-type terminal to take advantage of the wide coverage area and robust communications interface provided by third or fourth generation mobile telecommunication networks, there are aspects of these networks which are not well suited to simple and inexpensive devices. This is because such networks are generally optimised for use by devices that require high data rates and low latency. Although power usage is an important consideration for such devices, it is to some extent of secondary concern to issues of data rates and latency. The type of functions performed by a typical MTC-type terminal on the other hand (for instance collecting and reporting back data on a relatively infrequent basis) do not typically require high data rates furthermore are typically not time-critical.

The inventors have recognised a desire to allow certain types of terminal device to operate within a mobile telecommunications network with lower power consumption than other conventional terminal devices operating within the network.

It is an aim of the present disclosure to alleviate this problem.

SUMMARY

According to a first aspect, there is provided a method of operating a terminal device in a wireless telecommunications system which, during a mode transition state, supports a first mode of operation where the terminal device does not communicate with the wireless telecommunications system and a second mode of operation where the terminal device does communicate with the wireless telecommunications system, the method comprising:
transitioning from the first mode of operation to the second mode of operation at the expiration of a time period whereby the time period is defined by the data traffic pattern to the terminal device.

According to a second aspect, there is provided

According to a second aspect, there is provided a method of operating a base station in a wireless telecommunications system which, during a mode transition state, supports a first mode of operation where the base station does not communicate with the terminal device and a second mode of operation where the base station does communicate with the terminal device, the method comprising: transitioning from the first mode of operation to the second mode of operation at the expiration of a time period whereby the time period is defined by the data traffic pattern to the terminal device.

According to a third aspect, there is provided a terminal device for use in a wireless telecommunications system which, during a mode transition state, supports a first mode of operation where the terminal device does not communicate with the wireless telecommunications system and a second mode of operation where the terminal device does communicate with the wireless telecommunications system, the terminal device comprising: a transceiver unit configured to communicate with the wireless telecommunications system and a processor unit configured to control the transceiver unit to transition from the first mode of operation to the second mode of operation at the expiration of a time period whereby the time period is defined by the data traffic pattern to the terminal device.

According to a fourth aspect, there is provided a base station for use in a wireless telecommunications system which, during a mode transition state, supports a first mode of operation where the base station does not communicate with a terminal device and a second mode of operation where the base station does communicate with the terminal device, the base station comprising: a transceiver unit configured to communicate with the terminal device and a processor unit configured to control the transceiver unit to transition from the first mode of operation to the second mode of operation at the expiration of a time period whereby the time period is defined by the data traffic pattern to the terminal device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 4 to 6 schematically represent some aspects of a conventional discontinuous reception (DRX) mode of a wireless telecommunication network;

DESCRIPTION OF THE EMBODIMENTS

Figure 1:
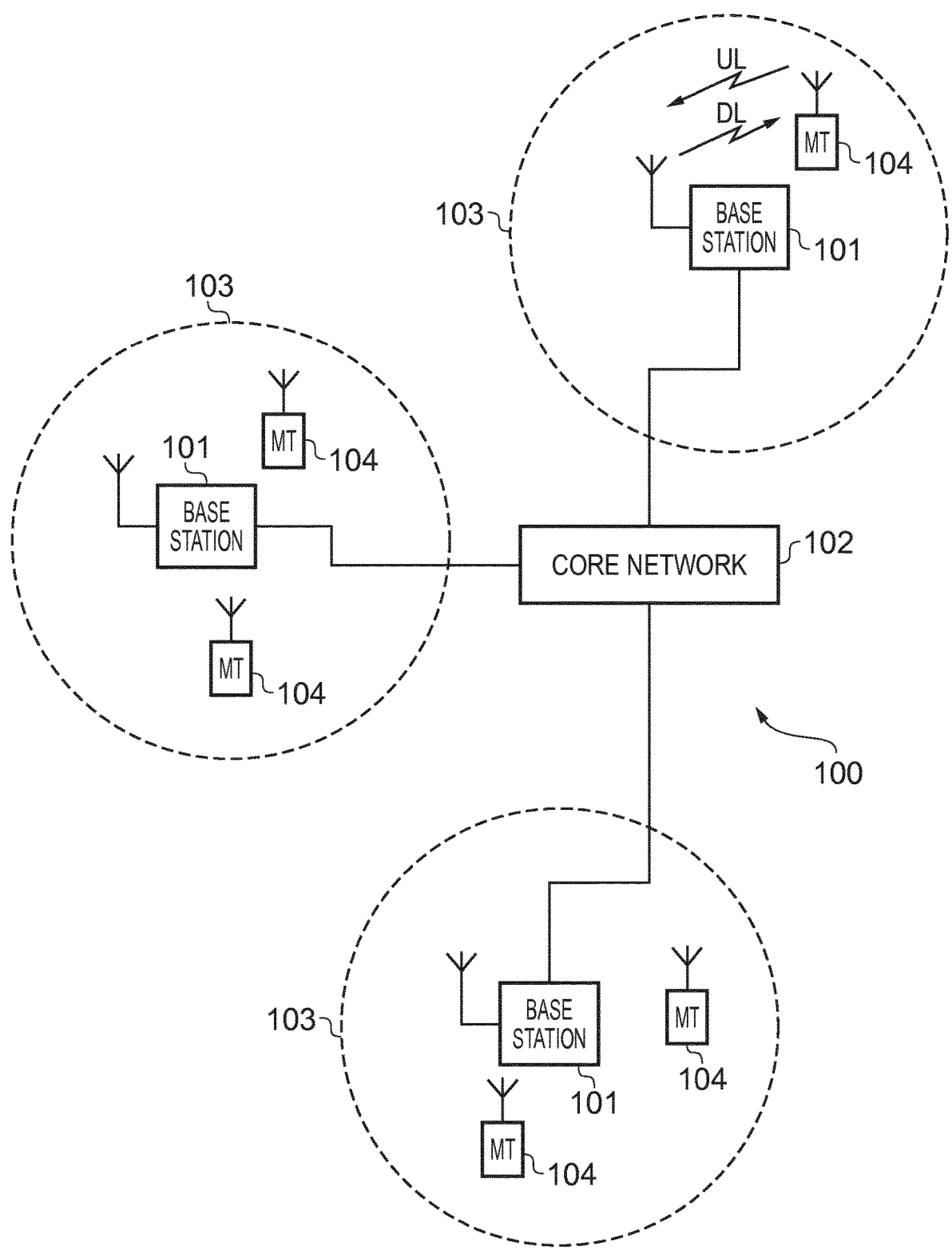
FIG. 1 schematically represents an example of a conventional LTE-type wireless telecommunication network.

Referring now to the drawings, wherein like reference numerals designate identical or corresponding parts throughout the several views.

FIG. 1 provides a schematic diagram illustrating some basic functionality of a wireless telecommunications network/system operating in accordance with LTE principles. Various elements of FIG. 1 and their respective modes of operation are well-known and defined in the relevant standards administered by the 3GPP® body and also described in many books on the subject, for example, Holma, H. and Toskala, A. [2].

The network includes a plurality of base stations 101 connected to a core network 102. In this regard, features that take place in the wireless telecommunications network could therefore take place in any one of the base station, core network or any other part of the network or any combination of parts of the wireless telecommunications network. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, in this context MTC UE and so forth. Base stations may also be referred to as transceiver stations/nodeBs/e-NodeBs/eNBs, and so forth.

Figure 2:
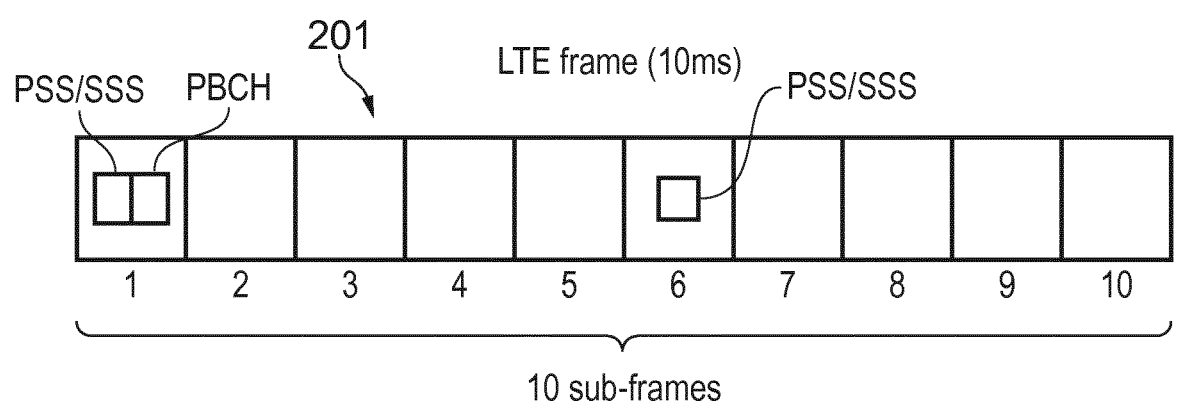
FIG. 2 schematically represents some aspects of a conventional LTE radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe 20 lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
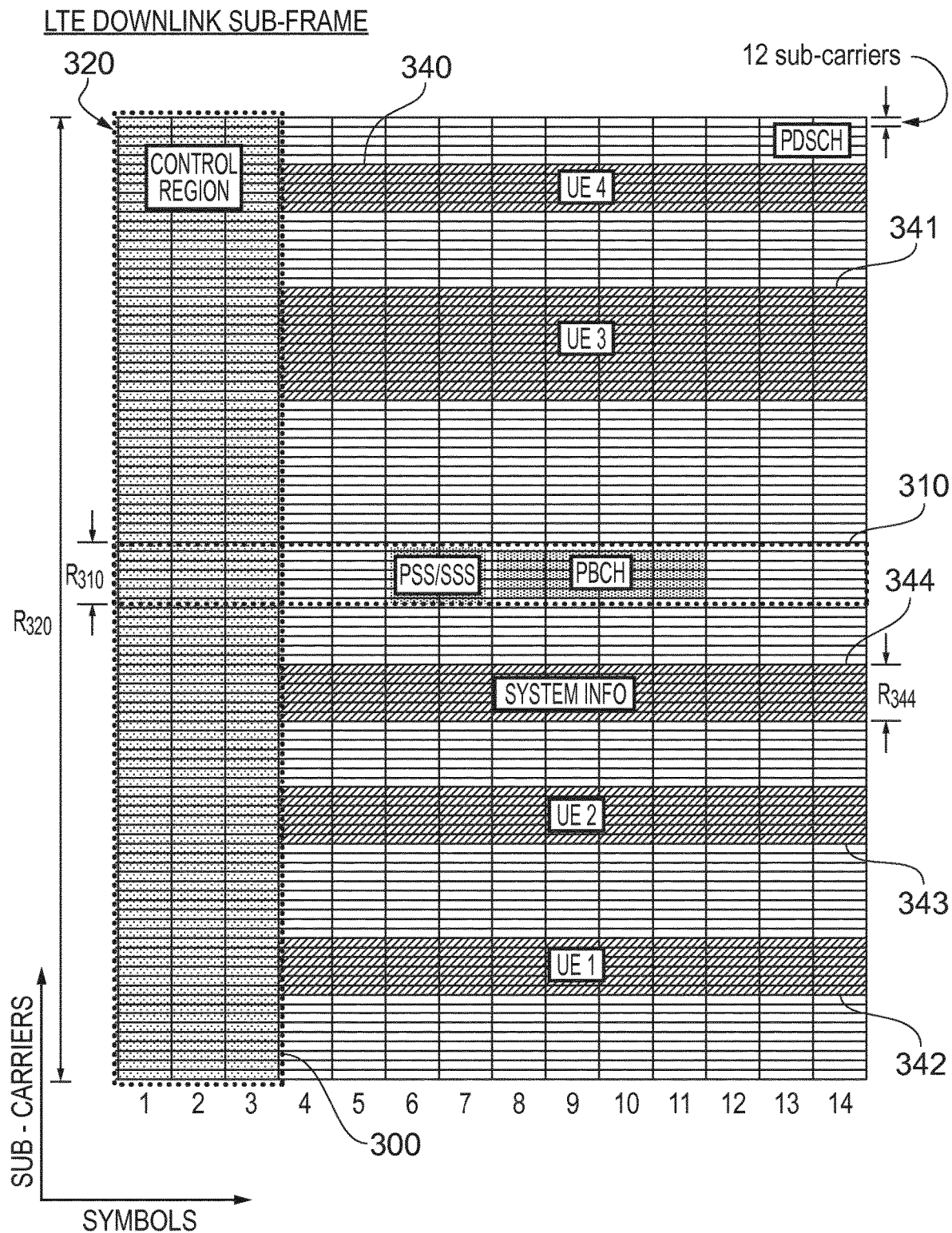
FIG. 3 schematically represents some aspects of a conventional LTE downlink radio 15 subframe.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread 30 across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344. A conventional LTE frame will also include reference signals which are not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). Data transmitted on the PDCCH, PCFICH and PHICH is typically distributed on the sub-carriers across the entire bandwidth of the subframe to provide for frequency diversity.

A terminal device in radio resource control (RRC) connected mode and RRC Idle mode receives and decodes PDCCH in subframes to identify if there are any transmission resource allocations (resource grants) for the terminal device in the subframe. A terminal device is thus required to receive and decode PDCCH for all subframes in which the terminal device might potentially be allocated transmission resources, even though in many of these subframes there might not be any data for the terminal device. Resources used in receiving and decoding PDCCH in subframes for which there is no data for the terminal device are in effect wasted. With this in mind, a known technique for lowering power consumption in LTE-type terminals is to restrict the number of subframes for which a terminal device should monitor PDCCH using discontinuous reception, DRX, techniques. DRX techniques involve a terminal device and a base station in effect agreeing times (e.g. particular subframes) during which the terminal device will be monitoring downlink physical channels and the base station can expect the terminal device to receive transmissions sent to it. The terminal device thus knows that outside these agreed times there are subframes when it will not receive transmissions from the base station, and the terminal device may conserve power during these subframes by not receiving and decoding PDCCH.

Thus, a DRX mode comprises alternating periods during which a terminal device could potentially receive data from the base station (and hence should monitor PDCCH) and periods during which the terminal device will not receive data (and hence need not monitor PDCCH to save power). The subframes in which the terminal device could receive data from the base station may be referred to as DRX inactive periods and the subframes in which the terminal device should not receive data from the base station may be referred to a DRX active periods.

Figure 6:
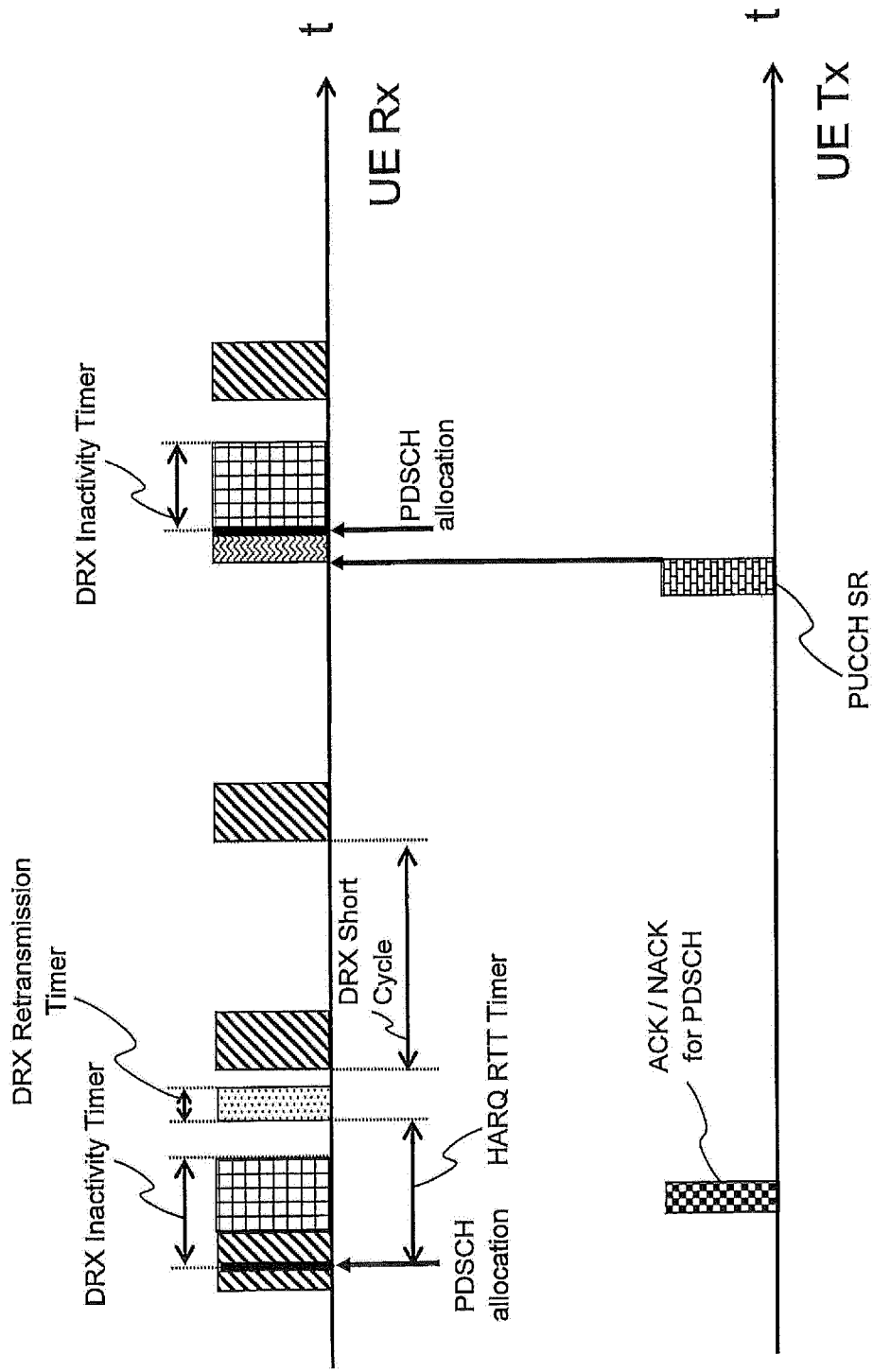

In a conventional LTE network the timings of DRX inactive periods and DRX active periods for a given terminal device in RRC Connected mode are defined by various parameters (which may be defined in terms of numbers of subframes). There are six basic DRX parameters that define the pattern of DRX inactive and DRX active periods in LTE. These are:
(i) DRX Cycle
(ii) On Duration Timer
(iii) DRX Short Cycle
(iv) DRX Short Cycle Timer
(v) DRX Inactivity Timer
(vi) DRX Retransmission Timer FIGS. 4 to 6 are schematic diagrams showing how the above-identified DRX parameters are defined on a representative time axis t. (The timings in these figures are represented for clarity of explanation and are not necessarily shown to scale.)

FIG. 4 schematically represents the basic underlying DRX cycle with periods when the terminal device receiver circuitry is active and monitoring PDCCH (DRX inactive) schematically represented by diagonally shaded blocks on the time axis t. This aspect of the LTE DRX mode may be referred to herein as the "normal" or "basic" DRX cycle/mode. The timings relating to this normal DRX cycle are set by the parameters DRX Cycle and On Duration Timer as schematically represented in the figure. Thus, in the normal DRX mode a terminal device activates its receiver circuitry and monitors PDCCH for a period corresponding to On Duration Timer once every DRX Cycle.

A relatively long basic DRX cycle allows for more power to be conserved. However, a long basic DRX cycle also results in increased latency because there are longer periods of time during which the terminal device is not monitoring PDCCH (and hence cannot be contacted). To address this LTE provides for two durations of DRX cycle, namely the basic/normal DRX cycle represented in FIG. 4, and a shorter DRX cycle. The short DRX cycle is broadly similar to the normal DRX cycle in overall structure in that it also comprises a regular pattern of DRX inactive and DRX active periods. However, the short DRX cycle adopts a shorter repeat period. The operation of the short DRX cycle is governed by the parameters DRX Short Cycle and DRX Short Cycle Timer. DRX Short Cycle is the repeat period for the short DRX cycle (DRX Cycle is an integer multiple of DRX Short Cycle in LTE). DRX Short Cycle timer defines the number of short DRX cycle periods before the normal DRX cycle is entered. (In LTE the On Duration Timer applies for both short and normal DRX cycles.)

Thus a terminal device which has concluded communicating with a network initially enters the short DRX cycle mode before entering the longer/normal DRX cycle mode (assuming no communications are made during the period established by DRX Short cycle Timer). The principle underlying this approach in LTE is a recognition that a terminal device is more likely to need to re-communicate with a network relatively soon after a previous communication, and so a shorter DRX cycle can be used to reduce latency for a period after a recent communication. If, however, the terminal device does not re-communicate with the base station during this period, the terminal device may then drop into the longer normal DRX cycle.

FIG. 5 schematically represents some aspects of the short DRX cycle in LTE. FIG. 5 is similar to, and will be understood from, FIG. 4, except the left-most DRX cycle in FIG. 4 is replaced in FIG. 5 with a section of short DRX cycle mode. In the example of FIG. 5 the DRX Short Cycle is one-half the normal DRX Cycle. The DRX Short Cycle Timer in this particular timing example is taken to expire at the end of the second DRX Short Cycle represented in FIG. 5 such that the normal (longer) DRX cycle, as represented in FIG. 4, picks up from this point.

In summary, in the absence of any transmissions to the terminal device or uplink scheduling requests, the DRX mode comprises a number of short cycles followed by a longer DRX opportunity until the next DRX cycle begins.

However, in addition to the regular and repeating DRX inactive periods during which a terminal device monitors PDCCH as represented in FIGS. 4 and 5, LTE defines various non-repeating/irregular DRX inactive periods during which a terminal device is required to monitor PDCCH, and these are schematically represented in FIG. 6.

The upper part of FIG. 6 is a timeline representing various periods during which a terminal device receiver is active while the lower part of FIG. 6 is a corresponding timeline representing periods during which the terminal device transmitter is active.

As with FIGS. 4 and 5, the upper part of FIG. 6 uses blocks to identify times at which the terminal device is required to monitor PDCCH.

Here it is assumed for the period of time prior to that represented in FIG. 6 the terminal device is in the normal DRX mode such as represented in FIG. 4, but in the left-most DRX inactive period represented in FIG. 6, the terminal device receives a downlink communication on PDSCH. This may be any conventional downlink communication.

In LTE, the receipt of a downlink communication initiates a timer during which a terminal device is required to continue monitoring PDCCH, even if the On Duration Timer associated with the normal regular and repeating DRX cycle expires. This timer is set by the DRX Inactivity Timer parameter. Thus, the DRX Inactivity Timer causes the DRX inactive period during which the terminal device must monitor PDCCH to be extended beyond the "normal" DRX inactive period if a downlink communication is received during the "normal" inactive period. This is schematically represented by the grid shading in FIG. 6 for the leftmost DRX inactive period. If any further communications are received by the terminal device during the extended DRX inactive period, the DRX Inactivity Timer is reset, thereby extending the DRX inactive period further still. Only once the DRX Inactivity Timer expires can the terminal device re-enter DRX active mode.

Although the expiration of the DRX Inactivity Timer is one mechanism to allow the UE to enter the DRX opportunity, the network may also send a DRX command to allow the terminal device to enter the DRX opportunity. Specifically, the network may set the logic channel ID (LCID) in the MAC sub-header as "11110" [3],[4]. Once the UE receives the command, the UE will go to sleep.

In response to the PDSCH allocation represented in the left-most DRX inactive period in the upper part of FIG. 6, the terminal device will, in accordance with conventional techniques, transmit uplink acknowledgement signalling (ACK/NACK signalling) for the (schematically represented in the lower part of FIG. 6 by the chequer-board shaded block). In LTE the terminal device sends its acknowledgement signalling four subframes after the subframe containing the relevant PDSCH allocation. If the terminal device is unable to properly decode the PDSCH allocation it will transmit negative acknowledgement (NACK) signalling. In response to this the base station schedules a retransmission of the information comprising the PDCCH allocation. In LTE the base station has some flexibility with regards to rescheduling the retransmission. The base station cannot reschedule the transmission before a time set by HARQ RTT Timer (e.g. eight subframes) after the initial PDSCH allocation has expired, but the base station does not need to schedule the retransmission in the subframe immediately after HARQ RTT Timer expires.

Accordingly, if a terminal device cannot properly decode a PDSCH allocation and transmits corresponding negative acknowledgement signalling, the terminal device must reactivate its receiver circuitry when HARQ RTT Timer expires in the expectation that the base station will at some stage after HARQ RTT Timer expires schedule a retransmission of the information sent in the previous PDSCH allocation. The parameter DRX Retransmission Timer specifies the amount of time the terminal device must remain active after expiry of HARQ RTT Timer to monitor PDCCH for a resource allocation for a retransmission of the earlier PDSCH allocation that was negatively acknowledged. This period of time during which the terminal device cannot remain in DRX active mode is schematically represented in FIG. 6 by the block with dotted shading. Although not shown in FIG. 6 for the purposes of clarity, a retransmission of a previous negatively-acknowledged PDSCH allocation may be expected to occur during the period corresponding to the DRX Retransmission Timer, and this will require the terminal device to remain in an active mode monitoring PDCCH waiting for the retransmission to be received on PDSCH or for the DRX Retransmission Timer to expire.

The additional periods during which the terminal device must monitor PDCCH under the DRX Inactivity Timer (grid shading in FIG. 6) and DRX Retransmission Timer (dot shading in FIG. 6) are over and above the regular short cycle and normal cycle DRX periods. The periods associated with the regular are repeating DRX cycles therefore remains, as indicated by the diagonal shaded blocks in FIG. 6 (with the short DRX cycle mode being triggered by the PDSCH allocation).

Thus, the left-hand half of FIG. 6 represents how the repeating and regular pattern of active and inactive DRX periods of FIGS. 4 and 5 becomes disrupted when a terminal device receives downlink communications and how this result in additional periods of time during which the terminal device must monitor PDCCH.

The right-hand half of FIG. 6 represents another situation which results in a terminal device needing to monitor PDCCH outside the repeating and regular pattern of active and inactive DRX periods such as represented in FIGS. 4 and 5. This is triggered by the terminal device making a scheduling request (SR) with an uplink transmission on the physical uplink control channel (PUCCH). A terminal device will typically do this when it wishes to request uplink resources because the terminal device has data it needs to communicate to the network. The PDCCH SR is schematically represented in the lower part of FIG. 6 by the brick-shaded block.

When a terminal device transmits a SR on PUCCH it can expect to receive a response from the base station on PDSCH. In order to receive the response, the terminal device must therefore monitor PDCCH for the PDSCH allocation message. That is to say, on sending the PUCCH SR, the terminal device must exit DRX active mode. This is schematically represented in FIG. 6 by the by the block with zigzag shading. Once the terminal device receives the PDSCH allocation in response to the PUCCH SR, the DRX Inactivity Timer is restarted as discussed above, and as schematically represented in the right-hand part of the upper timeline in FIG. 6.

Thus, the right-hand half of FIG. 6 represents how the repeating and regular pattern of active and inactive DRX periods of FIGS. 4 and 5 also becomes disrupted when a terminal device requests uplink resources and how this again results in additional periods of time during which the terminal device must monitor PDCCH.

The parameters DRX Cycle, On Duration Timer, DRX Short Cycle, DRX Short Cycle Timer, DRX Inactivity Timer, and DRX Retransmission Timer which define the DRX timings are shared between the base station and terminal device through RRC signalling in accordance with conventional techniques. The starting point of the DRX cycle (i.e. what might be termed its phase relative to the system frame numbering) is determined by DRX Start Offset which is communicated through RRC signalling. Thus both the terminal device and the network can determine from the system frame number the particular subframes when the terminal device receiver should be active and listening to PDCCH. This allows the base station to schedule transmissions to the terminal device at the appropriate times and the terminal device to activate its receiver circuitry to receive any such transmissions at the appropriate times.

Further information on conventional DRX operation in LTE-type networks can be found in the relevant standards. See, for example, ETSI TS 136 331 V11.3.0 (2013-04)/ 3GPP TS 36.331 version 11.3.0 Release 11 [5], and ETSI TS 136 321 V11.2.0 (2013-04)/3GPP TS 36.321 version 11.2.0 Release 11 [6].

The current RRC protocol and DRX operation are designed to target terminal devices with high traffic demands, small latency and high levels of mobility. The current RRC protocol and DRX operation does not therefore consider the unique properties of MTC type terminal devices. Typically, these devices have low traffic volume, infrequent and intermittent data bursts and a lack of mobility. These inherent incompatibilities of the RRC and DRX protocol design and the low energy consumption of MTC devices are to be addressed by the inventors in this disclosure.

FIG. 6 describes the DRX operation of a terminal device when operating in an RRC Connected mode. However, the terminal device may operate in an RRC Idle mode. In this mode, the terminal device has already registered with the network but is not connected and there is no radio link established between it and the network. In the RRC Idle mode the terminal device monitors a paging channel to detect incoming calls, acquires system information and performs neighbouring cell measurement and cell reselection. The upper layers may configure the terminal device with a terminal device specific DRX. The DRX cycle can be from 32 to 256 radio frames and the on duration is 1-4 subframes. The terminal device controls its own mobility and its location is only known at Tracking Area level.

Figure 7:
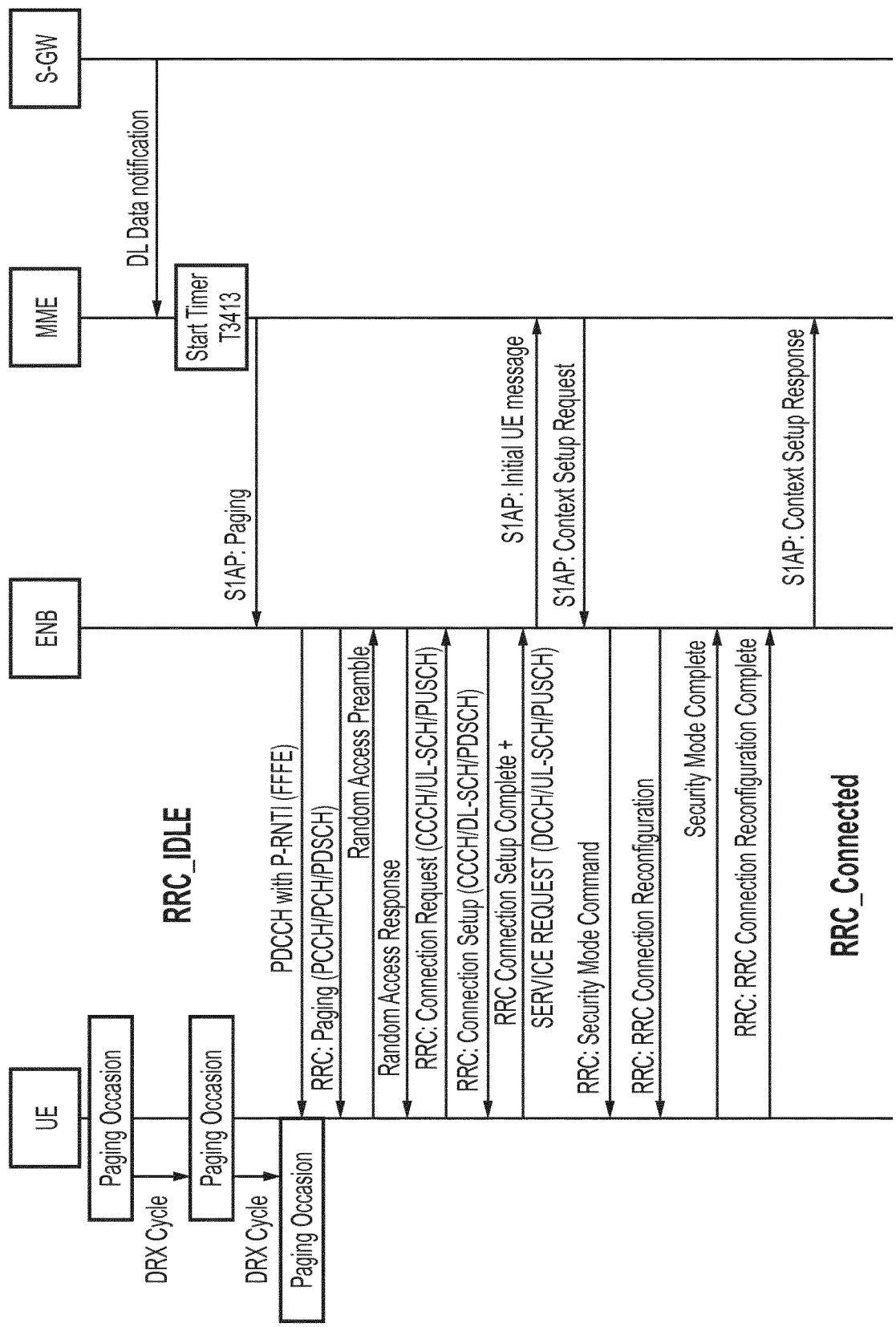
FIG. 7 shows a timing diagram explaining the RRC state transition from the RRC Idle mode to the RRC Connected mode.

FIG. 7 shows a timing diagram explaining the RRC state transition from the RRC Idle mode to the RRC Connected mode. The RRC state transition is explained below.

1. During the paging occasions in RRC idle mode, the terminal device wakes up to monitor PDCCH in order to search for the presence of a paging message. Once the terminal device finds the Paging Radio Network Temporary Identifier (P-RNTI) then it proceeds to decode the paging message located in PDSCH which is indicated by PDCCH.

2. After decoding the paging message, if the terminal device does not find its own terminal device identity then it returns to DRX operation in the RRC Idle mode. This is shown in the first two paging occasions in FIG. 7.

3. If the terminal device finds its identity in the message it triggers the Random Access Procedure (RAP) followed by the establishment of the RRC Connection, i.e. moving from the RRC Idle mode to the RRC Connected mode.

4. RAP: the UE sends a random access preamble to the base station and the base station confirms by sending a random access response (RAR).

5. RAP/RRC connection establishment: after the UE receives the RAR, a Layer 2/Layer 3 message is scheduled for uplink transmission to the base station on the PUSCH [7]. It conveys the RRC connection request.

6. RRC connection establishment: the base station sends the RRC connection setup message to the terminal device. The DRX operation parameters can be carried in this message.

7. RRC connection establishment: the terminal device sends back a message indicating the completion of RRC connection setup.

8. RRC connection establishment: upon reception of this message, the base station can also transmit to the terminal device the RRC messages including security mode command and RRC connection reconfiguration.

9. RRC connection establishment: the RRC state transition is complete once the terminal device sends back reconfiguration completion message. After this message exchange the RRC connection is established and the terminal device and network enter the RRC connected mode.

After the network moves the terminal device into the RRC connected mode, a terminal device inactivity timer is started immediately. It is a vendor-specific implementation choice and indicates the duration after the base station has cleared its Transmission buffer and does not detect any uplink data from the terminal device. In most LTE radio access networks (RAN), it is configured to approximately 10 s. After the RRC connection is established the UE may transmit and receive continuously or it may enter DRX mode. All the DRX operation parameters have been informed by the network via RRC setup or RRC reconfiguration message and listed in Table 1 below.

TABLE 1

| DRX Parameter | Description |
| --- | --- |
| DRX Cycle | The duration of one 'ON time' + one 'OFF time'. (This value does not explicitly specified in RRC messages. This is calculated by the subframe time and longdrx- CycleStartOffset) |
| onDurationTimer | The duration of 'ON time' within one DRX cycle |
| drx-Inactivity timer | Specify how long UE should remain 'ON' after the reception of a PDCCH. When this timer is on UE remains in 'ON state' which may extend UE ON period into the period which is 'OFF' period otherwise. |
| drx-Retransmission timer | Specifies the maximum number of consecutive PDCCH subframes the UE should remain active to wait an incoming retransmission after the first available retransmission time |
| shortDRX-Cycle | DRX cycle which can be implemented within the 'OFF' period of a long DRX Cycle. |
| drxShortCycleTimer | The consecutive number of subframes the UE shall follow the short DRX cycle after the DRX Inactivity Timer has expired |

When the network detects that the terminal device is not transmitting or receiving, the terminal device inactivity timer is activated. After the terminal device inactivity timer expires, an RRC connection release message is sent from the network and the terminal device transitions to the RRC idle mode to save radio resources and battery. This release procedure is shown in FIG. 8.

Figure 8:
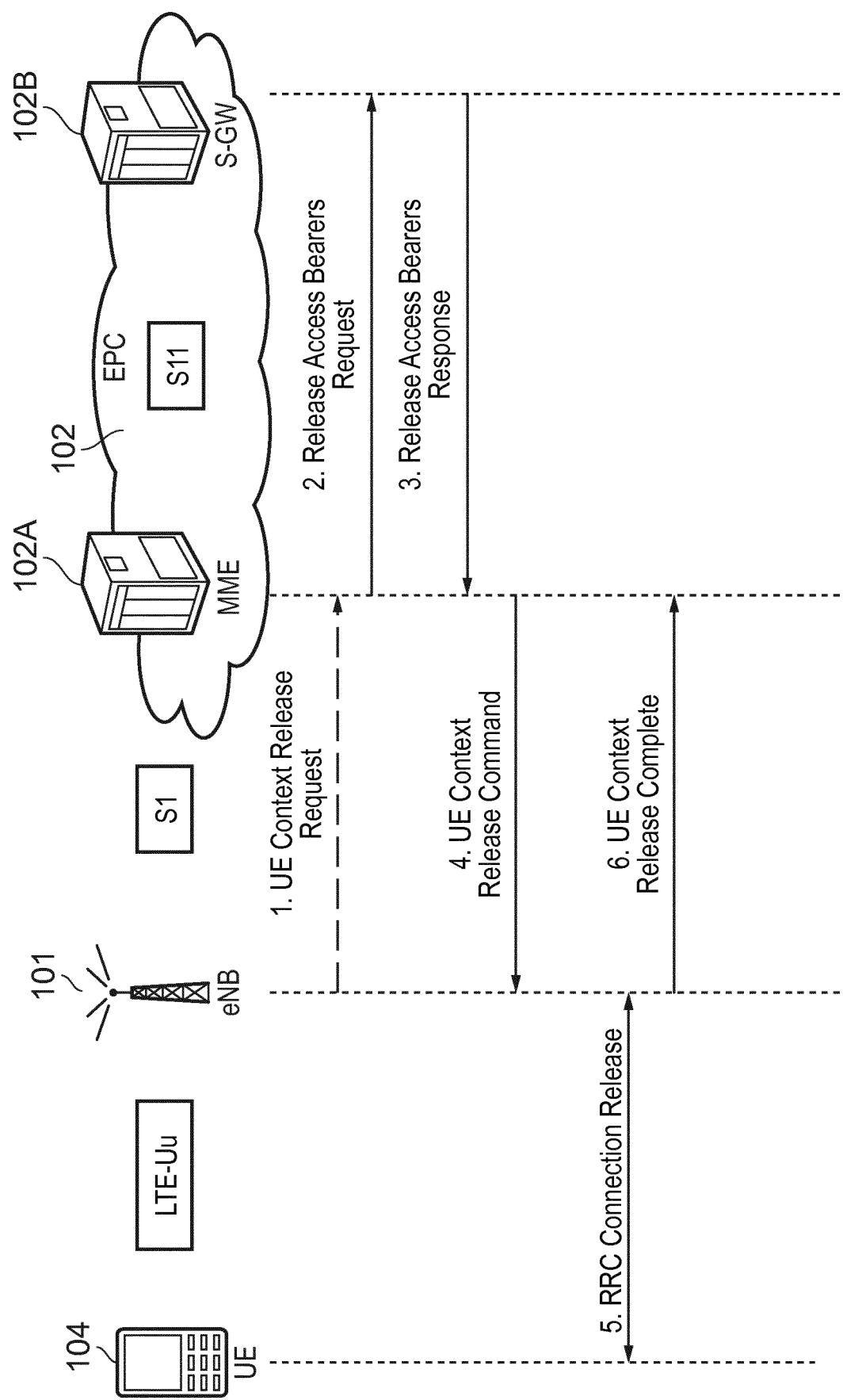
FIG. 8 shows a timing diagram explaining the release procedure from the RRC connected mode to the RRC idle mode.

Referring to FIG. 8, after the terminal device inactivity timer expires at the base station 101, a terminal device release request is sent to the Mobile Management Entity (MME) 102A. The MME 102A sends a Release Access Bearers request to the Serving GateWay (S-GW) 102B. The S-GW 102B sends a Release Access Bearers response back to the MME 102A. A terminal device Context release command is sent from the MME to the base station 101. An RRC connection release is established between the base station 101 and the terminal device 104. The base station 101 sends a terminal device context release complete signal to the MME 102A.

There are several issues with the current transition procedure between RRC Idle and RRC Connected modes and between the RRC Connected and the RRC Idle modes. Firstly, data traffic in MTC type terminal devices is far more infrequent compared with other traffic such as smartphone traffic. Typically, traffic for MTC type terminal devices may occur from once or twice a minute to once or twice a day. This means that many of the paging occasions are unnecessary and drain the battery of the terminal device.

Additionally, the MTC traffic is typically very short in length compared with other traffic. Therefore, in combination with the long period of time between consecutive occurrences of traffic for an MTC type terminal device, the transition between the RRC Connection mode and the RRC Idle mode is almost always repeated (with the corresponding signalling requirements) for a short MTC device packet.

Finally, many MTC type terminal devices, such as smart-meters and the like have little or no mobility. This is not considered in the current RRC state transition procedure.

Figure 9:
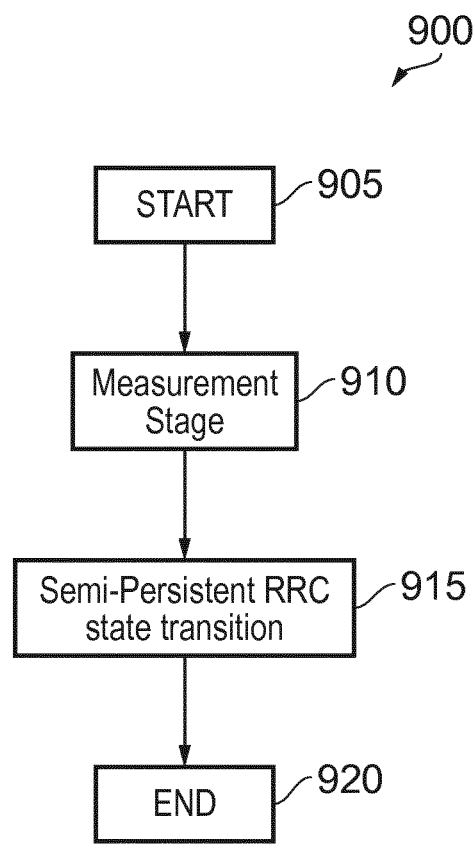
FIG. 9 shows a flow chart explaining embodiments of the disclosure.

A flow chart 900 describing, in general, embodiments of the present disclosure is shown in FIG. 9. The flow chart 900 starts at step 905. A first stage is conducted in step 910. Specifically, a measurement stage is conducted at step 910. The measurement stage will be described with reference to FIGS. 10A, 10B and 11.

After the measurement stage is conducted, a second stage is conducted in step 915. Specifically, a semi-persistent RRC state transition (SPRST) stage is carried out in step 915. The SPRST stage will be described with reference to FIGS. 12A, 12B, 13A, 13B, 14, 15, 16A, 16B and 17.

The flow chart then finishes at step 920.

Measurement Stage

During the measurement stage the inter-arrival times are determined from key traffic parameters. During the first stage with a measuring time duration $T_{ms}$, the base station 101 measures the key traffic parameters based on network memory. The key traffic parameters in this case are traffic parameters that indicate a downlink transmission to the UE. Examples of this may include a paging message having the particular UE identity such as the IMSI (International Mobile Subscriber Identity). Although the above mentions the base station 101 performing the measurement of inter-arrival times, the disclosure is no way limited to this. For example, the core network could measure the key traffic parameters and this the inter-arrival times. In this case, the result of the measurement stage could then be passed to the base station by the core network.

The duration of $T_{ms}$ is determined by the base station 101. Assuming a Poisson process for the MTC type terminal device [8], the traffic parameter to be measured is, in embodiments, the mean inter-arrival time $T_{int}$. It should be noted that other measures of inter-arrival time are envisaged such as the median inter-arrival time, or any kind of inter-arrival time. As different terminal devices receive downlink transmissions with different periodicity, different terminal devices will likely have different $T_{int}$. Therefore, a common $T_{ms}$ for all terminal devices will result in different measuring occasions. In this regard, $T_{ms}$ should be terminal device-specific in the sense that a common number of measuring occasions is defined as $N_{ms}$ and based on different $T_{int}$. Thus, $T_{ms}$ will be different for different terminal devices. Until the base station 101 has determined the traffic parameters, the terminal device 104 follows normal procedures in DRX and RRC mode changes. In other words, the terminal device 104 continues reading PDCCH in each DRX cycle and only leaves the RRC Connected mode once it is released by RRC signalling.

Of course, although the above mentions the base station 101 as collecting the key traffic parameters and measuring the traffic parameters, the disclosure is not so limited. As noted above, for example, the core network (CN) 102 could collect and measure the traffic parameters for each UE. This could take place, for example, by the core network providing statistics on inter-arrival times for all the radio bearers of a UE.

Once $T_{int}$ is obtained, the next step is to choose appropriate time at which the terminal device and network performs the transition from RRC idle to RRC connected mode. This is defined as $T_{trans}$ and is subject to one or more (in any order) of three defined service requirements: delay tolerance, false transmission probability and signalling overhead ratio.

Delay Tolerance—

In SPRST mode, it is expected that the transmission endures certain level of delay because as long as the system is in RRC idle mode, the arrived packets are buffered at the base station 101 and waits for the RRC state transition. The delay, denoted as $T_d$, is a random variable and the longer the $T_{trans}$, the larger the delay is envisaged. There are three different ways to demonstrate the delay caused by the SPRST scheme: maximal delay $T_{max}$, average delay $T_{ave}$, and probability delay $T_P$ which indicates that Prob$\{T_d \leq T_P\}=P$. Apparently, $T_{max}$ is equal to $T_{trans}$. In order to obtain $T_{ave}$ and $T_P$, we need to derive the probability density function (pdf) of the random variable $T_d$.

Assuming Poisson process with mean arrival rate $\lambda = 1/T_{int}$, we consider the general case where N packets are assumed to arrive between time $(l-1)T_{trans}$ and $lT_{trans}$ where l is a generic counter which is used to depict the interval between two occasions when the terminal device wakes up from power saving. This is diagrammatically shown in FIG. 10A that depicts the terminal device entering power saving mode at $(l-1)T_{trans}$ and wakes up again after one $T_{trans}$ interval at $lT_{trans}$. Whilst the 1$^{st}$ to Nth packet have been received at the base station buffer.

The n-th packet arrives at time $$s_n = (l-1)T_{trans} + \sum_{i=1}^{n} x_i, \qquad (1)$$

where $x_i$ is the inter-arrival time between packet (i−1) and i except $x_1$. Since all the packets arrived during time $((l-1)T_{trans}, lT_{trans})$ are buffered at the eNB 101 and sent until time $lT_{trans}$, the delay of the n-th packet is given as $$d_n = lT_{trans} - (l-1)T_{trans} - \sum_{i=1}^{n} x_i = T_{trans} - \sum_{i=1}^{n} x_i, \qquad (2)$$

Figure 10A:
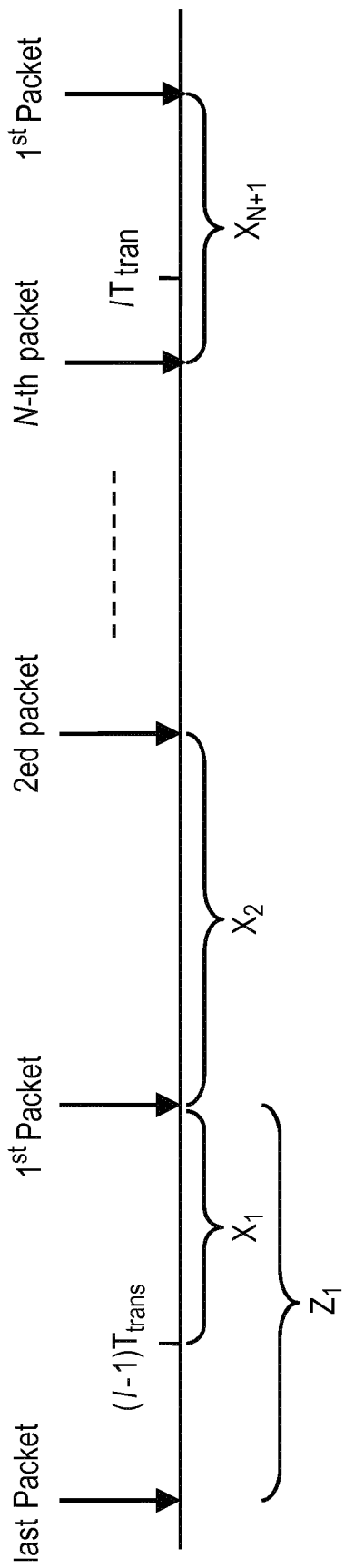
FIGS. 10A and 10B show diagrams displaying the arrival of packets in a typical Poisson process.

For the first packet, the inter-arrival time between itself and the previous packet is $z_1$. Clearly, $z_1$ and $x_2$ to $x_N$ follow the exponential distribution and are independent with each other. If $l=1$, $z_1=x_1$; otherwise $z_1 \geq x_1$. However, according to [9], $x_1$ also follows the exponential distribution and is independent with $x_2$ to $x_N$. This means that $d_n$ is irrelevant with l so that we can consider a simplified case as shown in FIG. 10A and we have $$s_n = \sum_{i=1}^{n} x_i, \qquad (3)$$

where $s_n$ follows the Erlang distribution.

Figure 10B:
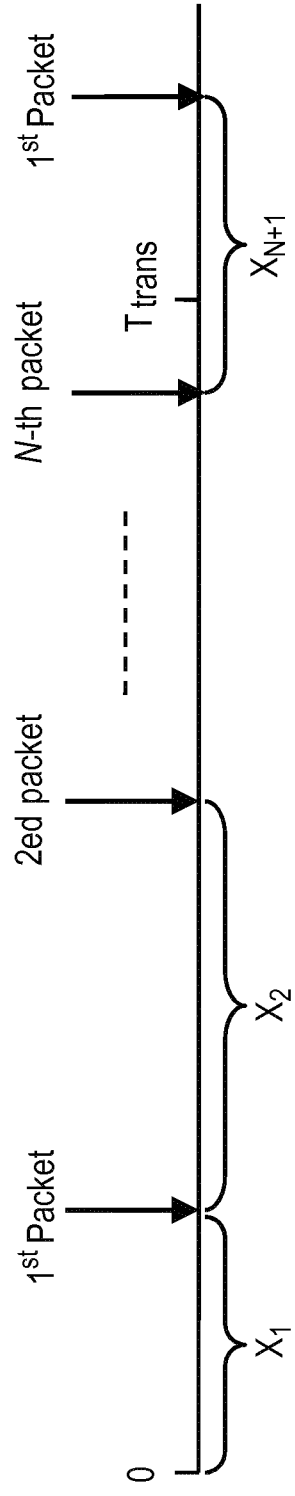

Referring to FIG. 10B, firstly consider the case N=1, i.e. there is only one packet arrived during time $(0, T_{trans})$. The joint density for $X_1$ and $S_2$ is $$f_{x_1 s_2}(x_1, s_2) = f_{x_1}(x_1) f_{x_2}(s_2 - x_1). \qquad (4)$$

The marginal density of $S_2$ can be obtained from integrating $x_1$ out from the joint density, which takes the form:

$$f_{x_1 s_2}(x_1, s_2) = \lambda^2 \exp(-\lambda x_1) \exp(-\lambda(s_2 - x_1)) = \lambda^2 \exp(-\lambda s_2), \text{ for } 0 \leq x_1 \leq s_2 \qquad (5)$$

The joint density does not contain $x_1$. Thus, for a fixed $s_2$, the conditional density of $X_1$ given $S_2 = s_2$ is uniform over $0 \leq x_1 \leq s_2$. Considering N=1, it implies that $T_{trans} \leq s_2$ so that the conditional density of $X_1$ is also uniform over $0 \leq x_1 \leq T_{trans}$. It is easy to see that the delay $d_n$ also follows the uniform distribution over $[0, T_{trans}]$ For the more general, the same behaviour is observed here as $$f_{s_1 s_{N+1}}(s_1, \ldots, s_N, s_{N+1}) = \lambda^2 \exp(-s_{N+1}) \text{ for } 0 \leq s_1 \leq \ldots \leq s_N \leq s_{N+1}. \qquad (6)$$

The interpretation here is the same as with $S_2$. The joint density does not contain any arrival time other than $s_n$, except for the ordering constraint $0 \leq s_1 \leq \ldots \leq s_{N+1}$, and thus this joint density is constant over all choices of arrival times satisfying the ordering constraint. If any $s_n$ is uniformly distributed, the delay $d_n$ is also uniformly distributed and the probability density function (pdf) and cumulative distribution function (CDF) are, respectively, $$p(d_n) = \frac{1}{T_{trans}}, F(d_n) = \frac{1}{T_{trans}} d_n. \qquad (7)$$

This equation reveals a very important conclusion that the distribution of the delay is solely determined by $T_{trans}$ and irrelevant with respect to the mean inter-arrival time, i.e. the feature of the Poisson process.

Figure 11:
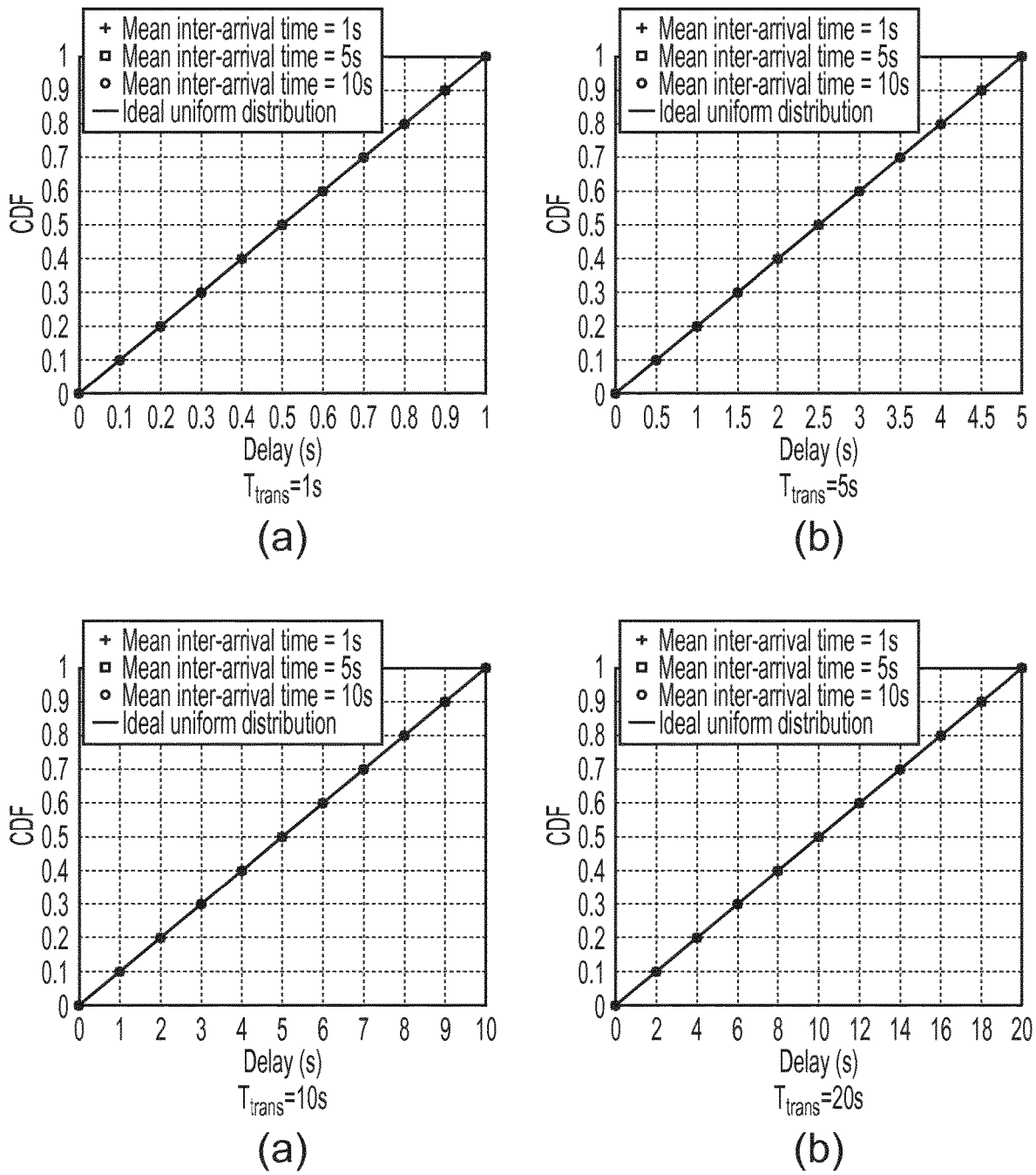
FIG. 11 shows the cumulative distribution function (CDF) of the delay for $T_{trans}$=1, 5, 10, and 20 s for different mean arrival time (1, 5 and 10 s)

FIG. 11 shows the cumulative distribution function (CDF) of the delay for $T_{trans}=1, 5, 10$, and 20 s for different mean arrival time (1, 5 and 10 s). The aforementioned conclusion is confirmed by the perfect match between the curves from Monte-Carlo simulation and theoretical derivation. The distribution of the delay is irrelevant with the distribution of the inter-arrival time but only determined by $T_{trans}$. Then we have $$T_{ave} = T_{trans}/2, T_P = P \cdot T_{trans}. \qquad (8)$$

Even though the machine type traffic is usually delay tolerant, it does not mean the machine type device can stand infinite delay and there could be an upper limit $T_{up}$ for it. This upper limit set the first constraint for the value of $T_{trans}$. As aforementioned, there are three constraints on the delay, in order to satisfy all the constraints, $T_{trans}$ are given:

$$T_{trans} \leq \min\{T_{max}, 2T_{ave}, T_P/P\}. \qquad (9)$$

False Transition Probability $P_{fal}$ $P_{fal}$ is defined as the probability that no data packet arrives during $T_{trans}$ so that although the RRC transition is conducted, no data is transmitted after RRC connection is established. Thus, the energy consumed as well as the signalling exchanged is wasted. It has been established by the inventors that the shorter the value of $T_{trans}$, the larger the possibility of no data packet arriving is. $P_{fal}$ can be obtained based on the distribution of the Poisson process as $$P_{fal} = \exp(-\lambda T_{trans}). \qquad (10)$$

Where $\lambda$ is a parameter used to represent the expected number of events in a time interval. Given a target $P_{fal}$ and assuming its corresponding $T_{min}$, we should have $$T_{trans} \geq -T_{int} \cdot \ln P_{fal}. \qquad (11)$$

Signalling Overhead Ratio

Another factor to consider is the signalling overhead ratio, i.e. signalling overhead per packet. As explained above, since the MTC traffic is normally intermittent bursty data packets, the relative amount of signalling over user plane data is usually very large because the RRC connection establishment and release requires a few hundred bytes at a time for very small amount of data to be transmitted. In this regard, it is more efficient that some packets are buffered at the base station 101 and transmitted to the terminal device in one occasion of RRC connection establishment and release. This is particularly relevant to MTC type data where latency is not normally critical.

Assuming that at least K packets are transmitted with one RRC transition (and thus providing a signalling overhead ratio 1/K) with a probability of $P_K$, it can be expressed as $$P_K = 1 - \sum_{k=0}^{K-1} \frac{\exp(-\lambda T_{trans})(\lambda T_{trans})^k}{k!} = f(T_{trans}). \quad (12)$$

Then the constraint on $T_{trans}$ is $$T_{trans} \geq f^{-1}(P_k). \quad (13)$$

Combining three constraints, we have $$\max\{f^{-1}(P_k), -T_{int}*\ln P_{fal}\} \leq T_{trans} \leq \min\{T_{max}, 2T_{ave}, T_P/P\}. \quad (14)$$

As an example, assuming the MTC traffic follows Poisson process with mean inter-arrival time of 30 seconds, in order to choose $T_{trans}$, the following constraints are assumed:

Maximal delay=250 s;
Average delay≤100 s;
99 percent of delay should be smaller than 200 s;
False transition probability $P_{fal} \leq 0.05$;
Once the RRC connection is established, the probability of transmitting at least 2 packets is more than 0.9.

Of course, other or different constraints may be provided and these may be set by the Mobile Network Operator (MNO). Based on equations (8)-(14), we have $$\max\{f^{-1}(0.9)=160, -T_{int}*\ln 0.05=89.87\} \leq T_{trans} \leq \min\{T_{max}=250, 2T_{ave}=200, T_P/P=202.2\}. \quad (15)$$

Thus $T_{trans}$ should be chosen in the range of [160,200].

Once the range of $T_{trans}$ is found, there are two possibilities to choose $T_{trans}$. It is possible to represent the length of $T_{trans}$ itself in seconds. However, in this example (where an average value of $T_{trans}$ is 180 ms), 8 bits would be required. Therefore to reduce signalling load, in embodiments of the disclosure, two options are provided that represent the length of $T_{trans}$ with fewer bits which saves signalling load:

Option 1: Let $T_{trans}'=(T_{min}+T_{max})/2$ and $N=\text{floor}(T_{trans}'/\Delta t)$, where $\Delta t$ is the maximal DRX cycle. As would be appreciated, the maximal DRX interval is a known figure which at the time of writing is 2.56 seconds. Therefore, $T_{trans}=N*\Delta t$. Then use L bits to indicate N. In other words, with option 1, $T_{trans}'$ is the mean average of the minimum and maximum value in the range of $T_{trans}$ derived from equation (15). In this case, $T_{trans}'$ is 180. N depicts how many maximal DRX cycles would fit into $T_{trans}$, which for a maximal DRX of 2.56 seconds, means N is 70. Therefore, using option 1, the value of 70 can be depicted with fewer bits than the value of 180.

Option 2: Let S={1, 2, 4, 8, 16, 32, 64, 128, 256, 512, 1024, 2048, 4096} (i.e. a sequence of numbers that are powers of two, $2^N$) and $N'=\text{floor}(T_{trans}'/\Delta t)$. N can only be chosen from S and $N=\text{argmin}|N'-N|$. $T_{trans}=N*\Delta t$. In this case, N' is an intermediate value and in this option, the value of N' is also 70. Instead of signalling N', however, a value from the list S that is closest to N' is selected as shown by $N=\text{argmin}|N'-N|$ which equals the value of N that minimises $|N'-N|$. As will be appreciated, the values of S are all binary maximum numbers. In other words, select a value from the list S that is closest to N' and in this example, N would be 64. With option 2, N=64 can be depicted with fewer bits than either depicting the length of $T_{trans}$ itself or option 1.

Both option 1 and option 2 have advantages. The advantage of the first option is the accuracy of $T_{trans}$ and the advantage of the second option is that less bits are used to indicate N compared with the first option.

Mechanism to Determine $T_{trans}$ in the Measurement Stage

In order to determine $T_{trans}$, the following steps are carried out:

Step 1—For the intended terminal device, the base station 101 stores the IMSI of the terminal device and sets the measuring time $T_{ms}$ and measuring time counter, $n_{ms}$ to 0.

Step 2—On the $n_{ms}$-th measuring occasion, once the base station 101 observes a paging message sent to the terminal device, the base station 101 saves the inter-arrival time $T_{n,ms}$ in association with the IMSI of the terminal device. The value $n_{ms}$ is set as $n_{ms}=n_{ms}+1$. If $n_{ms}<N_{ms}$, then step 2 is repeated. If not, step 3 is commenced.

Step 3—For the terminal device, $$T_{int} = \sum_{n_{ms}=0}^{N_{ms}-1} T_{n_{ms}}$$

Step 4—Using equation 14 and the assumed constraints, the range of $T_{trans}$ is determined.

Step 5—Use option 1 or 2 to determine $T_{trans}=N*\Delta t$ and the binary expression of N.

As would be appreciated, the base station 101 must know whether a particular terminal device 104 that is being paged is under its cell. This is to ensure that the base station 101 can connect the paging message frequency (to a particular IMSI) with RRC signalling to the terminal device 104 in the cell. This allows the network to move to the SPRST stage. Due to the low mobility (or static) nature of MTC type terminal devices, it is unlikely that the terminal device will be associated with a different base station during the whole $T_{trans}$ measurement stage.

However, in the event that the terminal device 104 does move to operate under a different 101, the previous base station 101 can send the value of $T_{trans}$ (if calculated) or the values of $n_{ms}$ and measuring time $T_{ms}$ with the handover message to the different base station. Alternatively, when moving from communicating with one base station to another base station, the terminal device may be released from operating in the SPRST stage and wait until the network re-instructs the terminal device to operate in the SPRST stage again.

As a further alternative, if the core network (or RAN) made the appropriate measurements, the core network (or RAN) could pass the value of $T_{trans}$ to the new base station.

SPRST Stage

After the measurement stage has taken place and the value of $T_{trans}$ has been calculated, the terminal device 104 enters the SPRST stage where the terminal device 104 enters a state with timers guiding its transfer between the RRC Idle mode and the RRC Connected mode.

As an outline, the SPRST stage can be described as follows:

The duration of the SPRST stage is determined by a timer $T_{mode}$ at the base station 101. Once the measurement stage is complete, the base station 101 will instruct the terminal device 104 to enter the SPRST mode by sending a positive flag and the RRC transition timer $T_{trans}$ to the terminal device and the timer $T_{mode}$ starts. Once $T_{mode}$ expires, the base station 101 sends a negative flag to notify the terminal device 104 to go back to normal RRC operation.

In the SPRST mode, the RRC transition timer $T_{trans}$ is held at both the base station 101 and the terminal device. The timer at the base station starts at $T_{sprst}=0$ and the timer at the terminal device starts at $T_{sprst}=\Delta$, where $\Delta$ is determined by the propagation and processing delays (caused by decoding the PDSCH (or msg2) that carries $T_{trans}$ and the resetting of the RRC transition timer. This delay is negligible for the purposes of managing the simultaneous entry to and exit from SPRST mode for the base station and the terminal device. If a packet arrives at the base station 101 from the MME when $T_{trans}$ has not expired, the packet is buffered at the base station 101. At the terminal device side, the terminal device 104 keeps silent without being activated to checking paging message periodically when $T_{trans}$ has not expired. Once $T_{trans}$ expires, the terminal device 104 starts the random access procedure (RAP) by sending the random access (RA) preamble to the base station 101 followed by a RRC establishment procedure and $T_{trans}$ is reset immediately. In other words, every time $T_{trans}$ expires, the network automatically performs RRC transition from the RRC idle mode to the RRC connected mode, i.e. the RRC transition happens periodically depending on $T_{trans}$ but not on the paging occasions. Thus the energy consumed by periodically checking paging message in the RRC idle mode is saved.

Figure 12A:
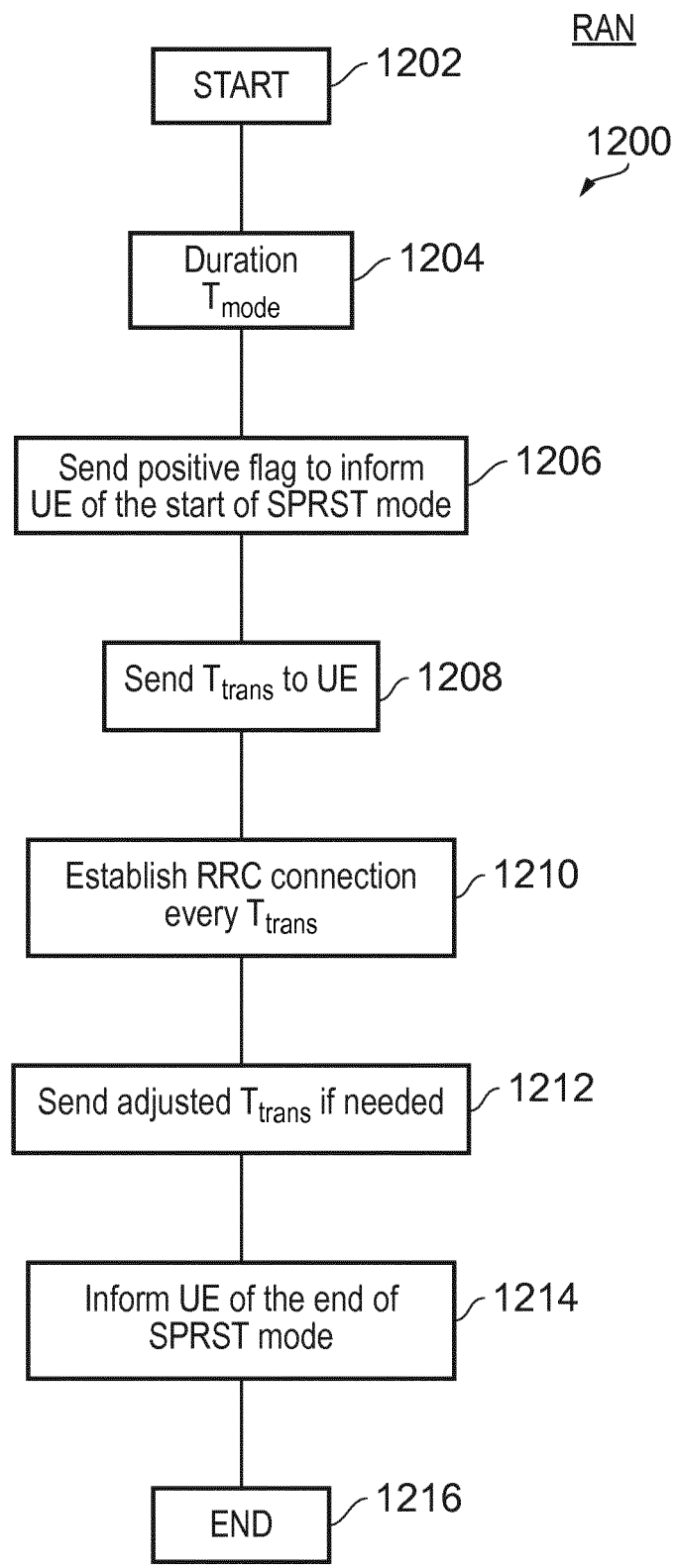
FIG. 12A shows a flow chart explaining the process for the SPRST stage from the RAN side.
Figure 12B:
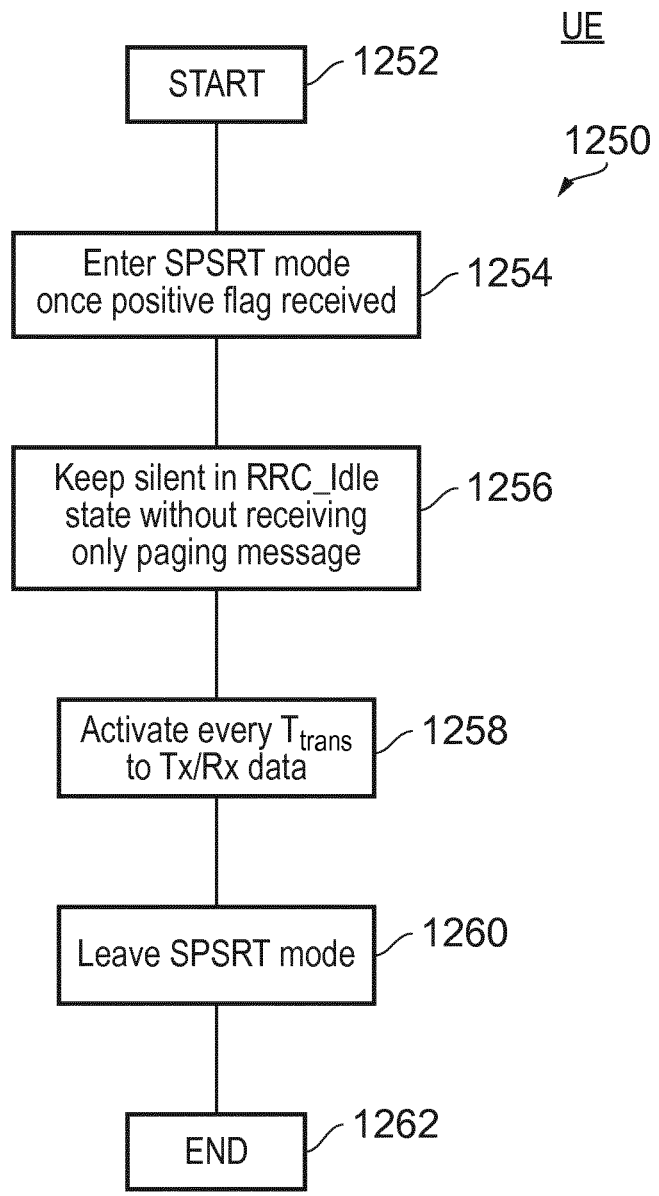
FIG. 12B shows a flow chart explaining the process for the SPRST stage from the terminal device side.

FIG. 12A shows a flow chart explaining the process for the SPRST stage from the RAN side and FIG. 12B shows a flow chart explaining the process for the SPRST stage from the terminal device side.

Referring to FIG. 12A, the flow chart 1200 starts at step 1202. In step 1204, a time indicating the length of time of the SPRST is determined. This time is deemed $T_{mode}$. $T_{mode}$ is the duration of time that the Semi Persistent RRC State Transition (SPRST) is in force. It is a parameter decided by the network when it decides how long to allow a terminal device to stay in a mode where it cannot be reached by the base station apart from every $T_{trans}$ when the terminal device wakes up. At the beginning of the process, the base station sets a timer with starting value of $T_{mode}$, and when that timer expires the base station commands the terminal device to return to normal RRC Connected mode with only DRX cycle to provide it power savings.

In step 1206, the RAN (via the base station 101) sends a positive flag to the terminal device 104 instructing the terminal device 104 to enter the SPRST mode. This flag may be sent over the PDSCH. Of course, the flag may be sent in any appropriate packet or may be sent as a separate packet, but in embodiments, the flag may be sent in either the Random Access Response (msg2) from the base station or in the RRC Connection Setup Message. In the RRC Connection Setup Message, there is room for non-critical extensions which allow adding of further bit fields into the fields of that message. The base station 101 starts timer $T_{SPRST}$ at 0 when the base station 101 enters the SPRST mode (the SPRST mode expiring when the value in timer $T_{SPRST}$ equals $T_{mode}$). Of course, the timer $T_{SPRST}$ may start at $T_{mode}$ and count down to 0.

The value of $T_{mode}$ is the duration of the SPRST mode. This is a parameter value that is fed into the timer $T_{SPRST}$.

In step 1208, the RAN (via the base station 101) sends the calculated $T_{trans}$ value to the terminal device. This value is sent during the RRC: Connection setup message, which is carried on PDSCH, signalling between the base station 101 and the terminal device 104.

During the period $T_{trans}$ the terminal device 104 does not check the paging message. Any packets which are destined for the terminal device 104 during the period $T_{trans}$ are stored at the base station 101. In step 1210, the RAN and the terminal device 104 establish RRC Connected mode at the expiration of the time $T_{trans}$. As the RAN and terminal device 104 establish the RRC Connected mode, the packets stored at the base station 101 are transmitted to the terminal device 104 after the RRC Connected mode has been established.

If, during the period of $T_{trans}$, an adjustment needs to be made to the value of $T_{trans}$ in subsequent $T_{trans}$ periods, a new value of $T_{trans}$ may be included in the packets stored at the base station 101. When the packets are then sent to the terminal device 104 during the RRC_Connected mode set at the expiration of the $T_{trans}$ period, the terminal device 104 will receive the updated $T_{trans}$ and will use the new value of $T_{trans}$ subsequently. This is step 1212 in FIG. 12A.

The value of $T_{trans}$ may be updated in response to a change in the value of $T_{trans}$ determined during the measurement stage. In other words, although a value of $T_{trans}$ is set initially during the measurement stage, the measurement stage does not end when a value of $T_{trans}$ is determined. In fact, the measurement stage continues whenever the terminal device 104 is operating in the SPRST mode. Therefore, the value of $T_{trans}$ may be periodically updated.

Although the calculated value of $T_{trans}$ may vary during the measurement stage, the terminal device and RAN may only operate on a new value of $T_{trans}$ when the measured value of $T_{trans}$ varies from the operational value of $T_{trans}$ by a predetermined amount such as 2% or by some other threshold set either by the Standard or by an MNO. Additionally, or alternatively, the value of $T_{trans}$ may be changed in dependence on the stored packets. In this case, if when the terminal device 104 and the base station 101 operate using the RRC_Connected mode at the expiration of $T_{trans}$ there are no stored packets, then the value of $T_{trans}$ may be too short. This is especially the case if there are no stored packets for consecutive expired periods of $T_{trans}$. This is because at the expiry of $T_{trans}$, the terminal device 104 downloads the stored packets which are destined for the terminal device 104. Therefore, if there are no stored packets, this means no packets are destined for the terminal device 104 during this period and so the period is too short.

Conversely, if data packets which would have been sent to the terminal device 104 on two or more different occasions during a single $T_{trans}$ period are stored, then the $T_{trans}$ may be too long. In this instance, however, if the data packets have a high level of delay tolerance (i.e. are not time critical data packets), then having data packets that would have been sent to the terminal device 104 on two or more different occasions during one $T_{trans}$ period may not be problematic.

It is desirable to have a suitable value of $T_{trans}$ because a $T_{trans}$ that is too short involves unnecessary RRC_Connected mode transitions which is wasteful of power and having a $T_{trans}$ value that is too long can increase latency of the data packets which is unsuitable for time critical packets.

After the expiration of $T_{mode}$ the RAN (via the base station 101) informs the terminal device 104 of the end of the SPRST mode. This is achieved by the RAN sending a negative flag (via the base station 101) to the terminal device 104 to notify the terminal device 104 to return to normal RRC operation. This is step 1214 but will be explained in more detail later.

The process ends at step 1216.

Referring to FIG. 12B, the flow chart 1250 starts at step 1252. After the terminal device 104 receives the positive flag from the base station 101 (sent in step 1206 of FIG. 12A), the terminal device 104 starts operating in the SPSRT mode. This is step 1254. As noted above, the timer $T_{SPRST}$ starts at 0 in the base station 101. However, to ensure that the base station 101 and the terminal device 104 are synchronised, the $T_{SPRST}$ timer at the terminal devices starts as soon as it receives and decodes the message carrying $T_{trans}$ from the base station. In practice, the UE timer starts at Δ, where Δ is determined by the propagation and processing delays as explained above. This delay is negligible for the purposes of synchronous operation over SPSRT mode between the base station and the terminal device.

In step 1256 the terminal device 104 remains silent in the RRC Idle mode and is not activated to check paging messages periodically when the value of $T_{trans}$ has not expired. In step 1258, timer $T_{trans}$ expires and the terminal device 104 starts the random access procedure by sending the random access preamble to the base station 101 followed by an RRC establishment procedure. This transitions the terminal device 104 from the RRC Idle mode to the RRC Connected mode. The value of $T_{trans}$ in the timer is reset and the stored data packets are then communicated over the air between the base station 101 and the terminal device 104.

After expiration of time $T_{mode}$, the terminal device 104 receives the negative flag from the base station 101 (step 1214 of FIG. 12A) and the terminal device 104 leaves the SPSRT mode in step 1260.

The process ends in step 1262.

In step 1206 of FIG. 12A and step 1254 of FIG. 12B, it is noted that the base station 101 and the terminal device 104 must enter the SPRST mode. Two alternative mechanisms for the base station 101 and terminal device 104 to enter the SPRST mode is described with reference to FIGS. 13A and 13B.

Figure 13A:
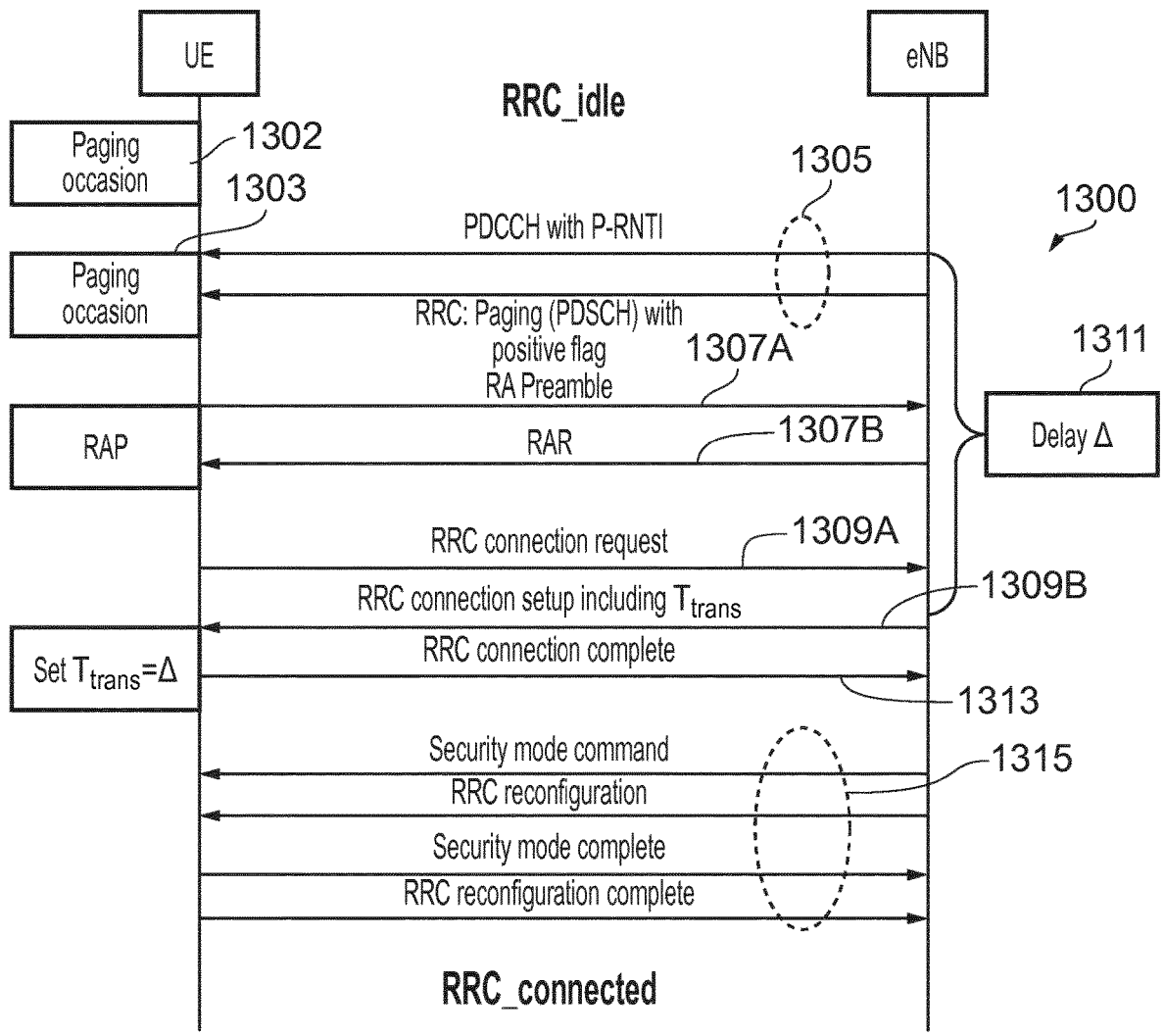
FIGS. 13A and 13B shows two alternative mechanisms for the base station 101 and terminal device 104 to enter the SPRST stage.

Alternative 1 is shown in FIG. 13A where a terminal device 104 communicates with a base station 101.

In step 1302, normal DRX is conducted at terminal device side and the terminal device 104 is activated to check paging message every $T_{DPX\_idle}$ seconds, where $T_{DPX\_idle}$ is the DRX cycle in RRC_idle mode.

In paging occasion 1303, the base station 101 receives a paging message from MME (via the base station 104) and sends the paging message to the terminal device 104 and with the paging message, a positive flag (1 bit) indicating the start of SPRST mode is sent as well. This is step 1305 and starts $T_{mode}$.

In step 1307A the terminal device 104 sends RA preamble and in step 1307B, the base station 101 sends back RAR.

In step 1309A, the terminal device 104 sends RRC connection request and in step 1309B, the base station 101 sends back the RRC connection setup message. Within the message, the DRX timers and the chosen value of $T_{trans}$ are included.

In step 1313 the terminal device 104 sends back RRC connection complete message to the base station 101.

In step 1315, the base station 101 sends security mode and RRC reconfiguration message and the terminal device 104 responds.

The terminal device 104 and the base station 101 are now operating in RRC Connected mode.

Figure 13B:
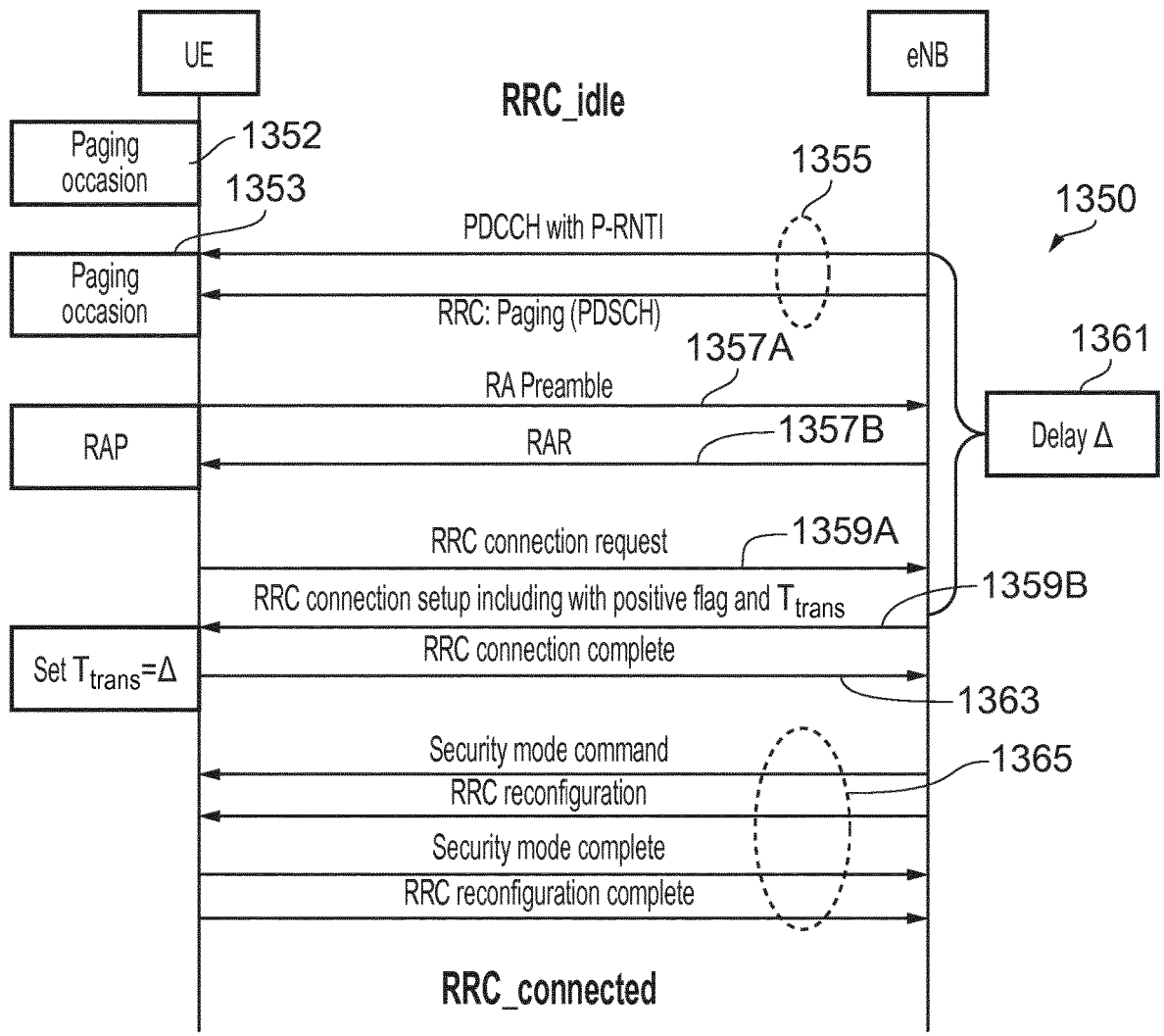

Alternative 2 is shown in FIG. 13B where a terminal device 104 communicates with a base station 101.

In step 1352, normal DRX is conducted at the base station side and the terminal device 104 is activated to check paging message every $T_{DRX\_idle}$ seconds, where $T_{DRX\_idle}$ is the DRX cycle in RRC idle mode.

In paging occasion 1353, the base station 101 receives a paging message from MME (via the base station 104) and sends the paging message to the terminal device 104.

In step 1357A the terminal device 104 sends RA preamble and in step 1357B, the base station 101 sends back RAR.

In step 1359A, the terminal device 104 sends RRC connection request and in step 1359B, the base station 101 sends back the RRC connection setup message. Within the message, a positive flag (1 bit) indicating the start of SPRST mode is sent as well as the DRX timers and the chosen value of $T_{trans}$ are included. This starts $T_{mode}$.

In step 1363 the terminal device 104 sends back RRC connection complete message to the base station 101.

In step 1365, the base station 101 sends security mode and RRC reconfiguration message and the terminal device 104 responds.

The terminal device 104 and the base station 101 are now operating in RRC Connected mode.

Once the terminal device 104 enters the RRC Connected mode, the terminal device 104 starts to transmit and receive data. In existing LTE systems, a terminal device inactivity timer is required to instruct the terminal device 104 to return to the RRC Idle mode. However, in embodiments of this disclosure, the terminal device inactivity timer is not required. Once transmission is completed, the base station 101 sends a RRC release message and the terminal device 104 enters the DRX mode and waits for the RRC release message. Without the terminal device activity timer, the terminal device 104 is expected to stay in DRX mode of the RRC Connected mode for a very short time before returning to the RRC Idle mode. The proposed RRC release procedure is shown in FIG. 14.

Figure 14:
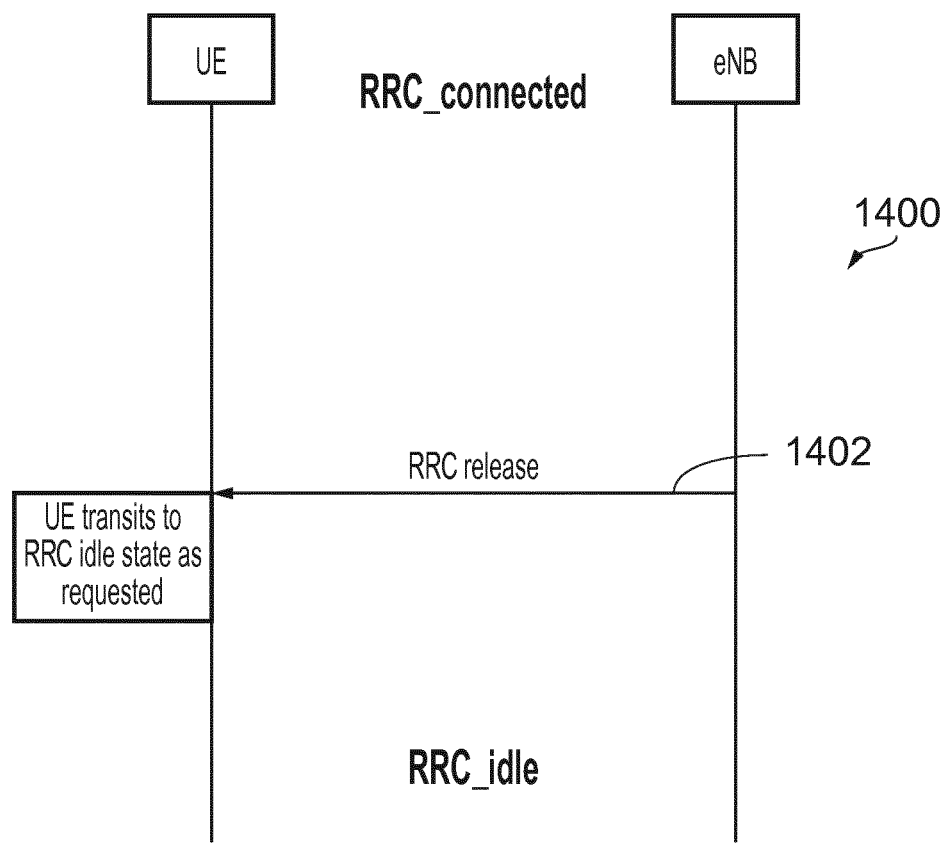
FIG. 14 shows a timing diagram of the RRC release procedure.

Referring to FIG. 14, a flow chart 1400 of the release mechanism is shown. In step 1402, the base station 101 sends the RRC release message to the terminal device 104. The terminal device 104 then transits to the RRC Idle mode as instructed by the base station 101.

After the first RRC establish and release procedure explained above in relation to FIGS. 13A, 13B and 14, the terminal device 104 will not be activated periodically to check the paging information because the data transmission for a given terminal device 104 only happens at a given time when $T_{trans}$ expires. Therefore, the RRC connection establishment procedure is illustrated as FIG. 15.

Figure 15:
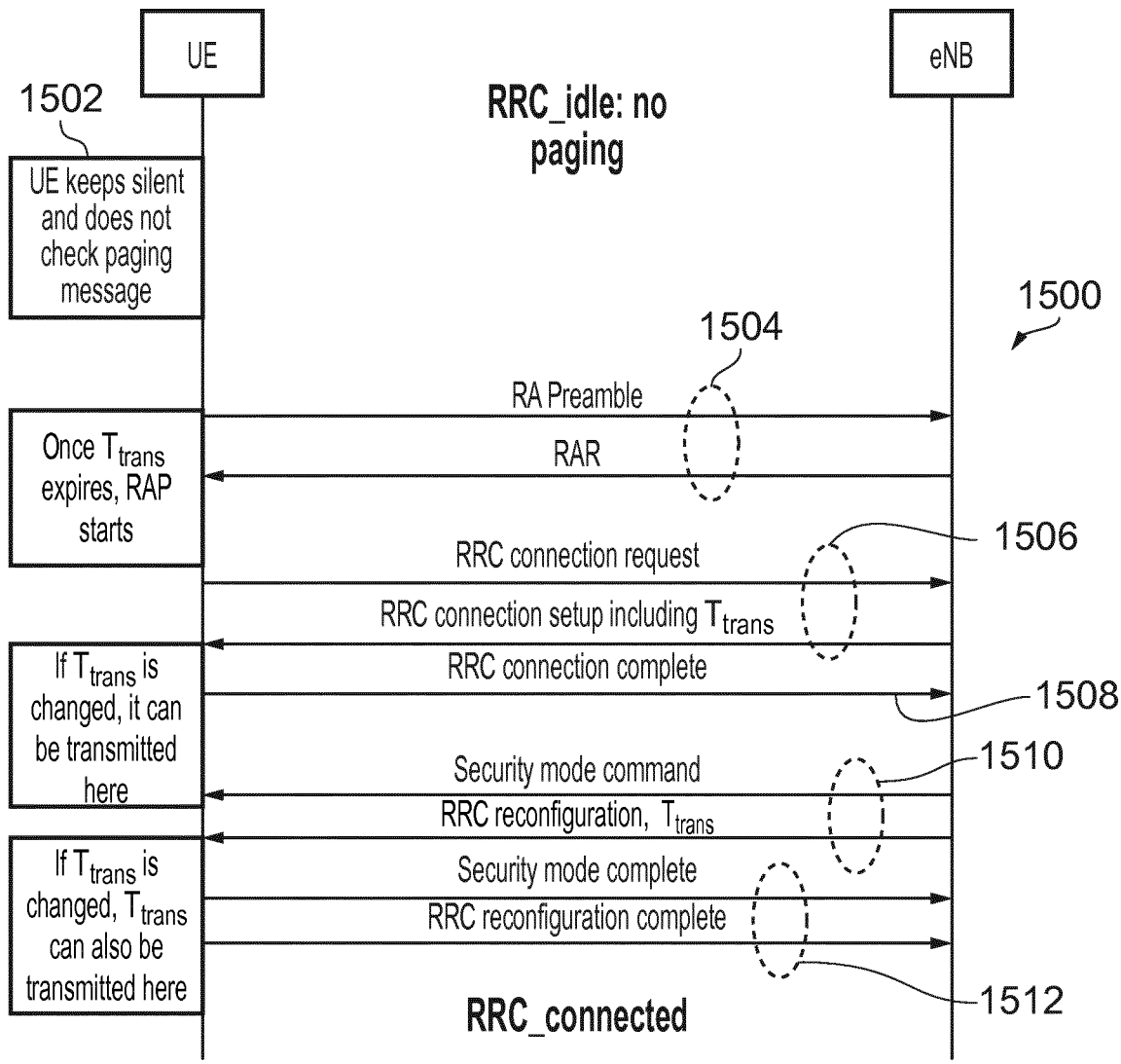
FIG. 15 shows a timing diagram of the RRC connection establishment procedure.

Referring to FIG. 15, a flow chart 1500 describing the RRC connection establishment procedure is shown. As the terminal device 104 is operating in the SPRST mode, the terminal device 104 remains silent and does not check the paging message 1502. Therefore, if the base station 101 receives packets from the MME before $T_{trans}$ expires, the packet goes to the buffer in the base station 101 for storage therein. Of course, the packets may be stored at the CN or RAN level if the CN or RAN control the SPRST mode. The terminal device 104 remains silent.

Once $T_{trans}$ expires at the terminal device 104, the terminal device 104 sends the RA preamble and the base station 101 sends back the RAR. This is step 1504.

The terminal device 104 sends the RRC connection request and the base station 101 sends back the RRC connection setup message. This is step 1506. Within the message, $T_{trans}$ can be included.

The terminal device 104 sends back the RRC connection complete message to the base station 101 in step 1508.

The base station 101 sends security mode and RRC reconfiguration message to the terminal device 104 in step 1510. $T_{trans}$ may also be transmitted here.

In step 1512, the terminal device 104 sends responses to the base station 101. In order to release the RRC connection, the same process as described with reference to FIG. 14 is followed.

Figure 16A:
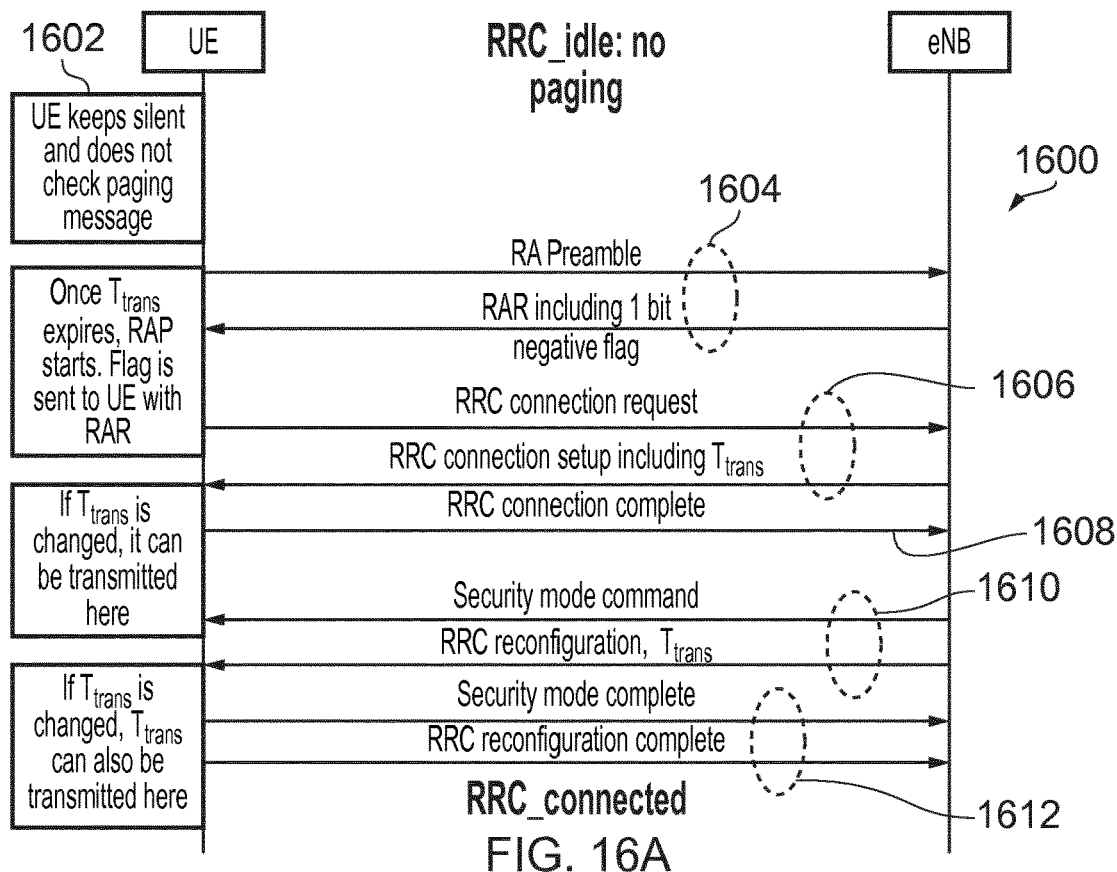
FIGS. 16A and 16B show the last RRC connection establishment procedure for the expiration of the SPRST stage.
Figure 16B:
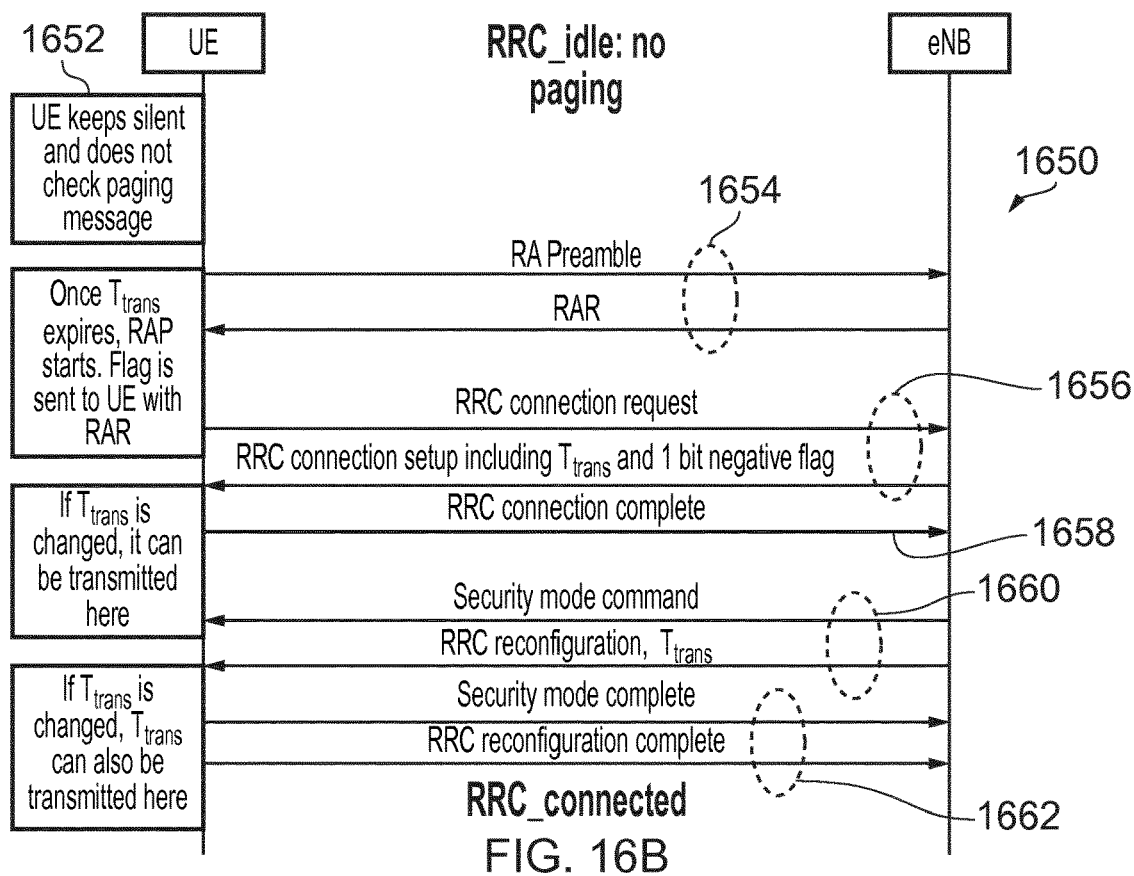

Once $T_{mode}$ expires at the base station 101, the base station 101 knows the SPRST mode should be switched back to normal RRC procedure. In order to achieve this, the base station 101 notifies the terminal device 104 to do so by sending a negative flag. Similar to the first RRC connection establishment procedure, there are two options: the negative flag may be carried by RAR response or may be carried in the RRC connection setup request message. The last RRC connection establishment procedure is shown in FIG. 16A and FIG. 16B. Specifically, the first option is shown in FIG. 16A and the second option is shown in FIG. 16B.

Referring to FIG. 16A, a flow chart 1600 describing the first option for the last RRC connection establishment procedure is shown. As the terminal device 104 is operating in the SPRST mode, the terminal device 104 remains silent and does not check the paging message 1602. Therefore, if the base station 101 receives packets from the MME before $T_{trans}$ expires, the packet goes to the buffer in the base station 101 for storage therein. The MTC UE remains silent.

Once $T_{trans}$ expires at the terminal device 104, the terminal device 104 sends the RA preamble and the base station 101 sends back the RAR. In the RAR, however, in this case a 1 bit negative flag is included that indicates that this is the last RRC connection establishment procedure. This is step 1604.

The terminal device 104 sends the RRC connection request and the base station 101 sends back the RRC connection setup message. This is step 1606. Within the message, $T_{trans}$ can be included.

The terminal device 104 sends back the RRC connection complete message to the base station 101 in step 1608.

The base station 101 sends security mode and RRC reconfiguration message to the terminal device 104 in step 1610. $T_{trans}$ may also be transmitted here.

In step 1612, the terminal device 104 sends responses to the base station 101.

Referring to FIG. 16B, a flow chart 1650 describing the second option for the last RRC connection establishment procedure is shown. As the terminal device 104 is operating in the SPRST mode, the terminal device 104 remains silent and does not check the paging message 1652. Therefore, if the base station 101 receives packets from the MME 102 before $T_{trans}$ expires, the packet goes to the buffer in the base station 101 for storage therein. The terminal device 104 remains silent.

Once $T_{trans}$ expires at the terminal device 104, the terminal device 104 sends the RA preamble and the base station 101 sends back the RAR. This is step 1654.

The terminal device 104 sends the RRC connection request and the base station 101 sends back the RRC connection setup message. This is step 1656. Within the RRC connection setup message, $T_{trans}$ can be included. Further, within the RRC connection setup message, a 1 bit negative flag is included that indicates that this is the last RRC connection establishment procedure.

The terminal device 104 sends back the RRC connection complete message to the base station 101 in step 1658.

The base station 101 sends security mode and RRC reconfiguration message to the terminal device 104 in step 1660. $T_{trans}$ may also be transmitted here.

In step 1662, the terminal device 104 sends responses to the base station 101.

After execution of the steps shown in either FIG. 16A or 16B, the terminal device 104 will operate in the RRC Connected mode. In order to transition from the RRC Connected mode to the RRC Idle mode, a release message is sent from the base station 101 to the terminal device 104. This is shown in FIG. 17.

Figure 17:
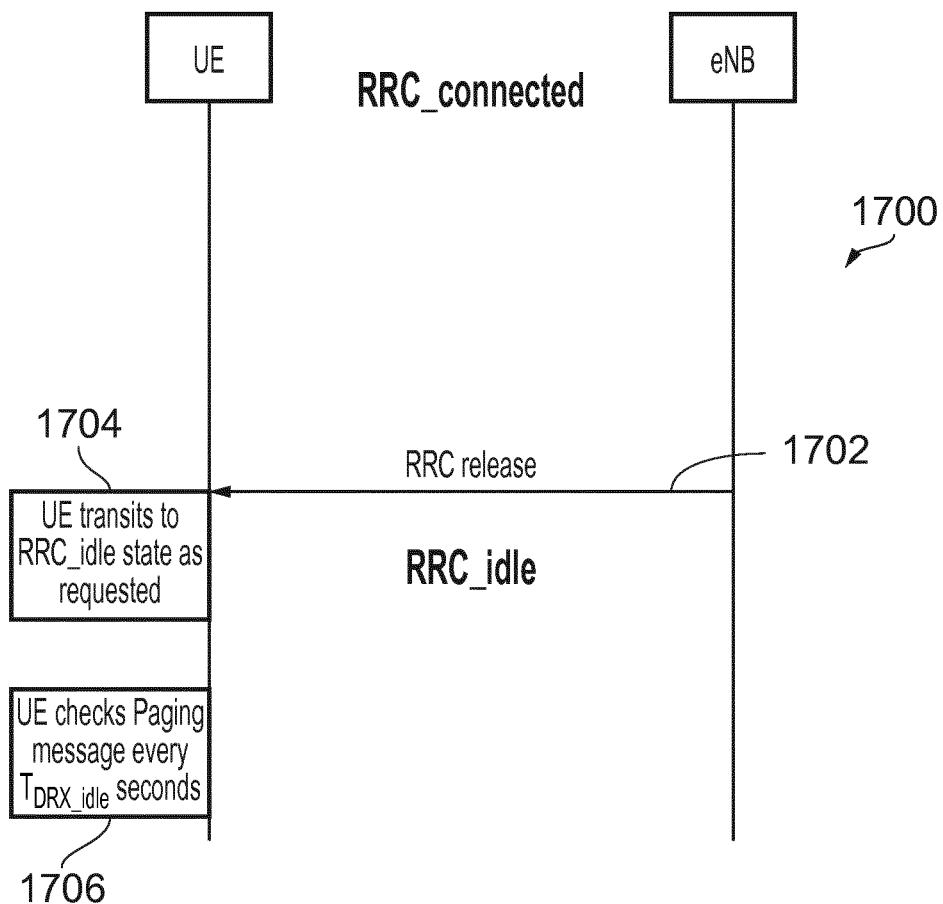
FIG. 17 shows a flowchart explaining the issuance of a release message from the base station to the terminal device.

FIG. 17 shows a flowchart 1700 explaining the issuance of a release message from the base station 101 to the terminal device 104. The base station 101 sends a release message to the terminal device 104 in step 1702. In response, the terminal device 104 transitions to the RRC Idle mode in step 1704. The terminal device 104 then enters the DRX state and checks the paging message every $T_{DRX\_Idle}$ seconds in step 1706.

With the above describe SPRST procedure, monitoring the paging occasions in the RRC idle mode is not required because for each terminal device 104, the RRC transition time is fixed and known to itself. The terminal device 104 can just wake up at given time to receive the data directed to it.

Since the base station 101 (in embodiments) acts as the main node controlling the SPRST scheme and determining the parameters, it can perform the measurement or estimation (based on CN information) of traffic simultaneously and adaptively adjust the parameters based on the measurement results (or information provided by CN) to achieve a subtle balance between latency and energy consumption. Of course, similar comments apply if the CN or RAN act as the controlling node for the SPRST scheme as is envisaged.

Further, it is noted that conventionally most data traffic pattern information is not relevant as conventional terminal devices react to human interaction. In other words, conventionally, a terminal device will become operational when a user interacts with the terminal device or when a notification (such as a call or text message) is sent from another user to the terminal device. Thus, past data traffic patterns in a conventional sense provide no real indication of future data traffic patterns. However, the inventors have departed from this convention and have set the transition from an idle state to a connected state based on data traffic patterns, thus cutting down on signalling and so saving energy.

If large latency is allowed, the packets can be aggregated and sent in one RRC Connected opportunity to reduce the overall RRC signalling load.

DRX is basically a MAC layer operation targeting to the terminal devices with high traffic demand and normal mobility. Other optimization schemes, such as baseband procedure optimization and power amplifier optimization, focus on physical layer and hardware. The proposed scheme happens in the RRC layer.

Figure 18:
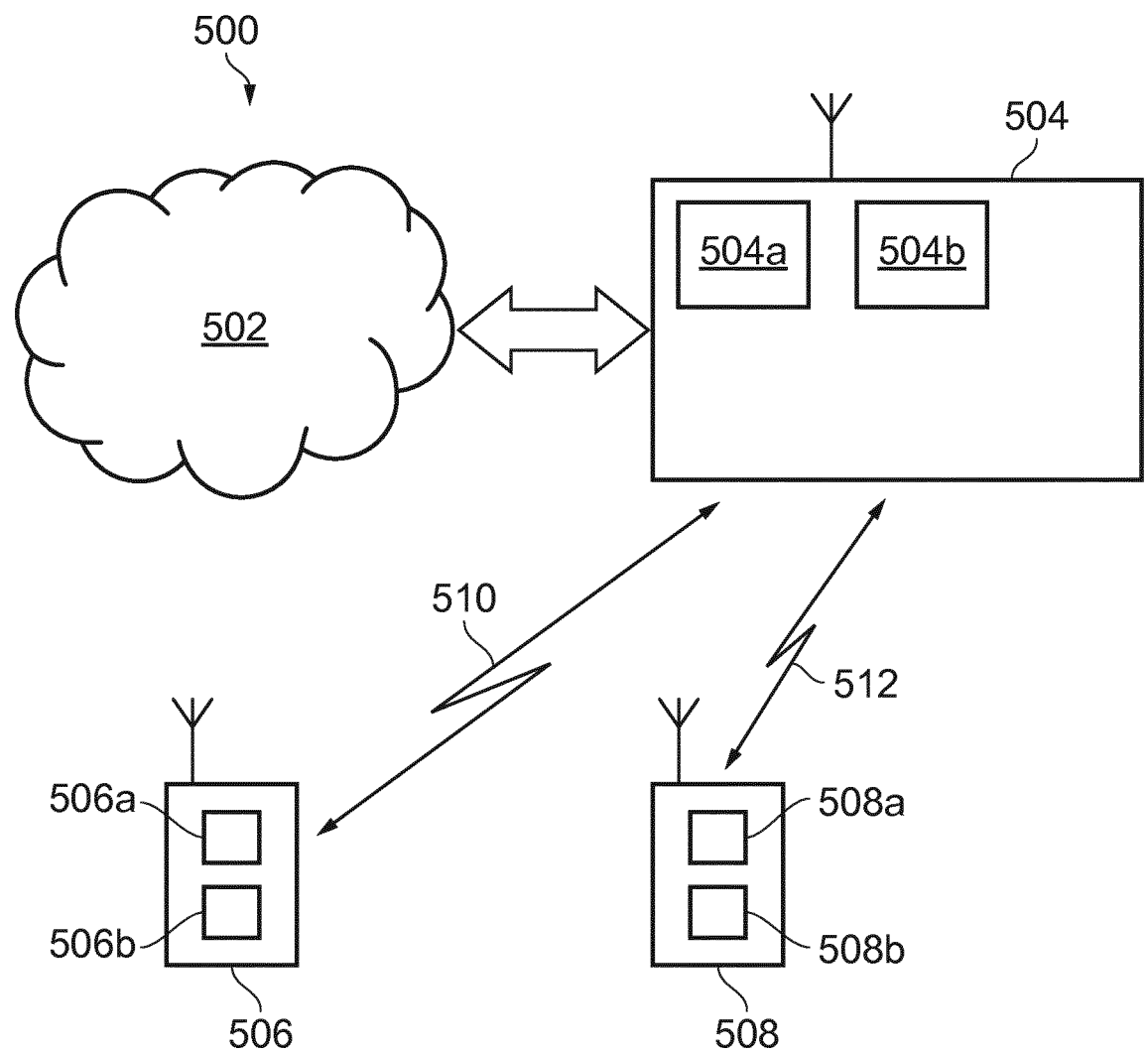
FIG. 18 schematically represents some aspects of a wireless telecommunication network configured to operate in accordance with certain embodiments of the present disclosure.

FIG. 18 schematically shows a telecommunications system 500 according to an embodiment of the present disclosure. The telecommunications system 500 in this example is based broadly around an LTE-type architecture. As such many aspects of the operation of the telecommunications system 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations 30 serving a larger number of terminal devices across various communication cells. However, only a single base station and two terminal devices are shown in FIG. 18 in the interests of simplicity.

As with a conventional mobile radio network, the terminal devices 506, 508 are arranged to communicate data to and from the base station (transceiver station) 504. The base station is in 35 turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 7 may be broadly conventional apart from where modified to provide functionality in accordance with embodiments of the present disclosure as discussed herein.

In this example, it is assumed the first terminal device 506 is a conventional smartphone type terminal device communicating with the base station 504 in a conventional manner. This conventional terminal device 506 comprises a transceiver unit 506a for transmission and reception of wireless signals and a processor unit 506b configured to control the device 506. The processor unit 506b may comprise a processor unit which is suitably configured/programmed to provide the desired functionality using conventional programming/configuration techniques for equipment in wireless telecommunications systems. The transceiver unit 506a 20 and the processor unit 506b are schematically shown in FIG. 7 as separate elements.

However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device 504 adapted to support operation in accordance with embodiments of the present disclosure when communicating with the base station 504. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 18 is such a device.

The MTC device 508 comprises a transceiver unit 508a for transmission and reception of wireless signals and a processor unit 508b configured to control the MTC device 508. The processor unit 508b may comprise various sub-units, for example a DRX control unit, for providing functionality in accordance with embodiments of the present disclosure as explained further herein. These sub-units may be implemented as discrete hardware elements or as appropriately configured functions of the processor unit. Thus the processor unit 508b may comprise a processor unit which is suitably configured/programmed to provide the desired functionality described herein using conventional programming/configuration techniques for equipment in wireless telecommunications systems. The transceiver unit 508a and the processor unit 508b are schematically shown in FIG. 18 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the MTC device 508 will in general comprise various other elements associated with its operating functionality.

The base station 504 comprises a transceiver unit 504a for transmission and reception of wireless signals and a processor unit 504b configured to control the base station 504 to operate in accordance with embodiments of the present disclosure as described herein. The processor unit 506b may again comprise various sub-units, such as a scheduling unit, for providing functionality in accordance with embodiments of the present disclosure as explained further below. These sub-units may be implemented as discrete hardware elements or as appropriately configured functions of the processor unit. Thus, the processor unit 504b may comprise a processor unit which is suitably configured/programmed to provide the desired functionality described herein using conventional programming/configuration techniques for equipment in wireless telecommunications systems. The transceiver unit 504a and the processor unit 504b are schematically shown in FIG. 18 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the base station 504 will in general comprise various other elements associated with its operating functionality.

Thus, the base station 504 is configured to communicate data with both the conventional terminal device 506 and the terminal device 508 according to an embodiment of the disclosure over respective communication links 510, 512. The base station 504 is configured to communicate with the conventional terminal device 506 over the associated radio communication link 510 following the established principles of LTE-based communications, and in particular using conventional DRX and RRC procedures. However, communications between the base station 504 and the MTC terminal device 508 operate using modified DRX and RRC procedures in accordance with certain embodiments of the present disclosure as described herein. Thus, one aspect of certain embodiments of the disclosure is that the base station is configured to operate by communicating with different classes of terminal device (e.g. a first class of terminal device, for example comprising conventional LTE terminal devices, such as smartphones, and a second class of terminal device, for example comprising MTC-type terminal devices) using different discontinuous reception procedures/modes and using the SPRST mode. That is to say, a base station may operate to communicate with a first class (group/type) of terminal device in accordance with a first DRX mode associated first DRX mode timings and to communicate with a second class (group/type) of terminal device in accordance with a second DRX and RRC mode associated second DRX and RRC mode timings, the rules governing the DRX mode timings of the second DRX and RRC modes being different from those of the first DRX and RRC modes. Whether or not a particular terminal device or base station supports modified DRX procedures in accordance with embodiments of the present disclosure may be established in accordance with conventional techniques for sharing terminal device and base station capability information in wireless telecommunications network, for example based on signalling exchange during a RRC connection establishment procedure.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software miming on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Some respective features of the present disclosure are defined by the following numbered paragraphs.

1. A method of operating a terminal device in a wireless telecommunications system which, during a mode transition state, supports a first mode of operation where the terminal device does not communicate with the wireless telecommunications system and a second mode of operation where the terminal device does communicate with the wireless telecommunications system, the method comprising:
transitioning from the first mode of operation to the second mode of operation at the expiration of a time period whereby the time period is defined by the data traffic pattern to the terminal device.

2. A method according to paragraph 1, comprising storing in the wireless telecommunications system, during the first mode of operation, data packets destined for the terminal device; and receiving from the wireless telecommunication system those stored data packets during the second mode of operation.

3. A method according to paragraph 2 wherein the data packets are stored in one of a base station, a network core or a radio access unit of the wireless telecommunications system.

4. A method according to any one of paragraphs 1 to 3 wherein, prior to entering the mode transition state, the time period is defined in the wireless telecommunications system by a method comprising the steps of:
determining a number of measuring occasions at which a paging message is sent from the wireless telecommunication system to the terminal device, the paging message being sent to indicate a data packet to send to the terminal device;
measuring, at each measuring occasion, the inter-arrival time of the data packet; and
determining a range of time period values based on the inter-arrival time over the measuring occasions.

5. A method according to paragraph 4, wherein the range for the time period is defined in accordance with a delay tolerance in communicating a data packet between the terminal device and the wireless telecommunications system such that the range of the time period complies with the constraint $$T_{trans} \le \min\{T_{max}, 2T_{ave}, T_P/P\}$$

Where $T_{trans}$ is the time period, $T_{max}$ is the maximum delay allowed in communicating the data packet, $T_{ave}$ is the average delay in communicating the data packet, and $T_P$ is an upper bound with probability P for the delay in communicating the data packet.

6. A method according to paragraph 4 or 5, wherein the range for the time period is defined in accordance with a probability that no data packet arrives during the first mode of operation such that the range of the time period complies with the constraint $$T_{trans} \ge -T_{int} * \ln P_{fal}$$

$T_{trans}$ is the time period, $T_{int}$ is the inter-arrival time and $P_{fal}$ is the probability that no data packet arrives during the first mode of operation.

7. A method according to paragraph 4, 5 or 6, wherein the range for the time period is defined in accordance with a ratio of signalling per data packet that complies with the constraint $$T_{trans} \ge f^{-1}(P_k)$$

Where $T_{trans}$ is the time period, and $$P_K = 1 - \sum_{k=0}^{K-1} \frac{\exp(-\lambda T_{trans})(\lambda T_{trans})^k}{k!} = f(T_{trans});$$

where K is the minimum number of packets transmitted during the second mode of operation, and $\lambda$ represents the expected number of events in a time interval in a Poisson process.

8. A method according to any one of paragraphs 4 to 7, comprising receiving a representation of a selected value for the time period, the representation being the closest integer number of maximal DRX durations in the selected value of the time period.

9. A method according to any one of paragraphs 4 to 7, comprising receiving a representation of a selected value for the time period, the representation being selected from a sequence of numbers that are powers of two, wherein the selection is closest to the integer number of maximal DRX durations in the selected value of the time period.

10. A method according to any preceding paragraph wherein the time period is calculated within one of the base station, a network core or a radio access unit.

11. A method according to any preceding paragraph, prior to operating in the mode transition state, further comprising the steps of:
receiving from the wireless telecommunications system a flag and the time period value; and in response to the flag, the method further comprises entering the mode transition state and operating in the second mode of the mode transition state.

12. A method according to paragraph 11, wherein the system flag and the time period value is sent with a paging message from the wireless telecommunication network.

13. A method according to paragraph 11, comprising the steps of: receiving a paging message from the wireless telecommunication network; sending a random access, RA, message to the wireless telecommunication network; receiving an RA response message from the wireless telecommunication network; sending a radio allocation control, RRC, connection request message and receiving an RRC setup message from the wireless telecommunication network, wherein the RRC setup message includes the system flag and the time period value.

14. A method according to any one of paragraphs 11, 12 or 13 comprising the steps of receiving, from the wireless telecommunication network, an RRC release message and in response to the RRC release message, the method comprises transitioning to the first mode of operation.

15. A method according to any one of paragraphs 11 to 14, wherein when the terminal device is operating in the second mode of the mode transition state, the method further comprises receiving, from the wireless telecommunications network, a second flag indicating that in response to the next RRC release message, the terminal device will leave the mode transition state.

16. A method according to paragraph 15 comprising sending a random access message and receiving from the wireless telecommunication system a random access response message that includes the second flag.

17. A method according to paragraph 15 comprising sending a random access message; receiving from the wireless telecommunication system a random access response message; sending a radio allocation control, RRC, connection request message and receiving from the wireless telecommunications system an RRC connection setup message that includes the second flag.

18. A method of operating a base station in a wireless telecommunications system which, during a mode transition state, supports a first mode of operation where the base station does not communicate with the terminal device and a second mode of operation where the base station does communicate with the terminal device, the method comprising:
transitioning from the first mode of operation to the second mode of operation at the expiration of a time period whereby the time period is defined by the data traffic pattern to the terminal device.

19. A method according to paragraph 18, comprising storing in the wireless telecommunications system, during the first mode of operation, data packets destined for the terminal device; and transmitting to the terminal device those stored data packets during the second mode of operation.

20. A method according to paragraph 19 wherein the data packets are stored in one of a base station, a network core or a radio access unit of the wireless telecommunications system.

21. A method according to any one of paragraphs 18 to 20 wherein, prior to entering the mode transition state, the time period is defined in the wireless telecommunications system by a method comprising the steps of:
determining a number of measuring occasions at which a paging message is sent from the wireless telecommunication system to the terminal device, the paging message being sent to indicate a data packet to send to the terminal device;
measuring, at each measuring occasion, the inter-arrival time of the data packet; and
determining a range of time period values based on the inter-arrival time over the measuring occasions.

22. A method according to paragraph 21, wherein the range for the time period is defined in accordance with a delay tolerance in communicating a data packet between the terminal device and the wireless telecommunications system such that the range of the time period complies with the constraint $$T_{trans} \leq \min\{T_{max}, 2T_{ave}, T_P/P\}$$

Where $T_{trans}$ is the time period, $T_{max}$ is the maximum delay allowed in communicating the data packet, $T_{ave}$ is the average delay in communicating the data packet, and $T_P$ is an upper bound with probability P for the delay in communicating the data packet.

23. A method according to paragraph 21 or 22, wherein the range for the time period is defined in accordance with a probability that no data packet arrives during the first mode of operation such that the range of the time period complies with the constraint $$T_{trans} \geq -T_{int} * \ln P_{fal}$$

$T_{trans}$ is the time period, $T_{int}$ is the inter-arrival time and $P_{fal}$ is the probability that no data packet arrives during the first mode of operation.

24. A method according to paragraph 21, 22 or 23, wherein the range for the time period is defined in accordance with a ratio of signalling per data packet that complies with the constraint $$T_{trans} \geq f^{-1}(P_k)$$

Where $T_{trans}$ is the time period, and $$P_K = 1 - \sum_{k=0}^{K-1} \frac{\exp(-\lambda T_{trans})(\lambda T_{trans})^k}{k!} = f(T_{trans});$$

where K is the minimum number of packets transmitted during the second mode of operation, and λ represents the expected number of events in a time interval in a Poisson process.

25. A method according to any one of paragraphs 22 to 24, comprising transmitting a representation of a selected value for the time period, the representation being the closest integer number of maximal DRX durations in the selected value of the time period.

26. A method according to any one of paragraphs 22 to 24, comprising transmitting a representation of a selected value for the time period, the representation being selected from a sequence of numbers that are powers of two, wherein the selection is closest to the integer number of maximal DRX durations in the selected value of the time period.

27. A method according to any one of paragraphs 18 to 26 wherein the time period is calculated within one of the base station, a network core or a radio access unit.

28. A method according to any preceding paragraph, prior to operating in the mode transition state, further comprising the steps of:
transmitting to the terminal device a flag and the time period value; and in response to transmitting the flag, the method further comprises entering the mode transition state and operating in the second mode of the mode transition state.

29. A method according to paragraph 28, wherein the system flag and the time period value is sent with a paging message from the wireless telecommunication network.

30. A method according to paragraph 28, comprising the steps of: transmitting a paging message to the terminal device; receiving a random access, RA, message from the terminal device; transmitting an RA response message to the terminal device; receiving a radio allocation control, RRC, connection request message and transmitting an RRC setup message to the terminal device, wherein the RRC setup message includes the system flag and the time period value.

31. A method according to any one of paragraphs 28, 29 or 30 comprising the steps of transmitting, to the terminal device, an RRC release message and in response to the transmission of the RRC release message, the method comprises transitioning to the first mode of operation.

32. A method according to any one of paragraphs 28 to 31, wherein when the base station is operating in the second mode of the mode transition state, the method further comprises transmitting, to the terminal device, a second flag indicating that in response to the next RRC release message, the base station will leave the mode transition state.

33. A method according to paragraph 32 comprising receiving a random access message and transmitting to the terminal device a random access response message that includes the second flag.

34. A method according to paragraph 33 comprising receiving a random access message; transmitting to the terminal device a random access response message; receiving a radio allocation control, RRC, connection request message and transmitting to the terminal device an RRC connection setup message that includes the second flag.

35. A terminal device for use in a wireless telecommunications system which, during a mode transition state, supports a first mode of operation where the terminal device does not communicate with the wireless telecommunications system and a second mode of operation where the terminal device does communicate with the wireless telecommunications system, the terminal device comprising:
a transceiver unit configured to communicate with the wireless telecommunications system and a processor unit configured to control the transceiver unit to transition from the first mode of operation to the second mode of operation at the expiration of a time period whereby the time period is defined by the data traffic pattern to the terminal device.

36. A device according to paragraph 35, wherein during the first mode of operation, data packets destined for the terminal device are stored within the wireless telecommunications system and the transceiver unit is configured to receive the stored data packets during the second mode of operation.

37. A device according to paragraph 36 wherein the data packets are stored in one of a base station, a network core or a radio access unit of the wireless telecommunications system.

38. A device according to any one of paragraphs 35 to 37 wherein, prior to entering the mode transition state, the time period using which the processor unit is configured to control the transceiver unit is defined in the wireless telecommunications system by:
determining a number of measuring occasions at which a paging message is sent from the wireless telecommunication system to the terminal device, the paging message being sent to indicate a data packet to send to the terminal device;
measuring, at each measuring occasion, the inter-arrival time of the data packet; and
determining a range of time period values based on the inter-arrival time over the measuring occasions.

39. A device according to paragraph 38, wherein the range for the time period is defined in accordance with a delay tolerance in communicating a data packet between the terminal device and the wireless telecommunications system such that the range of the time period complies with the constraint $$T_{trans} \leq \min\{T_{max}, 2T_{ave}, T_P/P\}$$

Where $T_{trans}$ is the time period, $T_{max}$ is the maximum delay allowed in communicating the data packet, $T_{ave}$ is the average delay in communicating the data packet, and $T_P$ is an upper bound with probability P for the delay in communicating the data packet.

40. A device according to paragraph 38 or 39, wherein the range for the time period is defined in accordance with a probability that no data packet arrives during the first mode of operation such that the range of the time period complies with the constraint $$T_{trans} \geq -T_{int} * \ln P_{fal}$$

$T_{trans}$ is the time period, $T_{int}$ is the inter-arrival time and $P_{fal}$ is the probability that no data packet arrives during the first mode of operation.

41. A device according to paragraph 38, 39 or 40, wherein the range for the time period is defined in accordance with a ratio of signalling per data packet that complies with the constraint $$T_{trans} \geq f^{-1}(P_k)$$

Where $T_{trans}$ is the time period, and $$P_K = 1 - \sum_{k=0}^{K-1} \frac{\exp(-\lambda T_{trans})(\lambda T_{trans})^k}{k!} = f(T_{trans});$$

where K is the minimum number of packets transmitted during the second mode of operation, and λ represents the expected number of events in a time interval in a Poisson process.

42. A device according to any one of paragraphs 38 to 41, wherein the transceiver unit is configured to receive a representation of a selected value for the time period, the representation being the closest integer number of maximal DRX durations in the selected value of the time period.

43. A device according to any one of paragraphs 38 to 41, wherein the transceiver unit is configured to receive a representation of a selected value for the time period, the representation being selected from a sequence of numbers that are powers of two, wherein the selection is closest to the integer number of maximal DRX durations in the selected value of the time period.

44. A device according to any one of paragraphs 34 to 43 wherein the time period is calculated within one of the base station, a network core or a radio access unit.

45. A device according to any one of paragraphs 34 to 44, prior to operating in the mode transition state, the transceiver unit is configured to:
receive from the wireless telecommunications system a flag and the time period value; and in response to the flag, the processor unit is configured to enter the mode transition state and to control the transceiver unit to operate in the second mode of the mode transition state.

46. A device according to paragraph 45, wherein the transceiver unit is configured to receive a system flag and the time period value with a paging message from the wireless telecommunication network.

47. A device according to paragraph 46, wherein the transceiver unit is configured to receive a paging message from the wireless telecommunication network; send a random access, RA, message to the wireless telecommunication network; receive an RA response message from the wireless telecommunication network; send a radio allocation control, RRC, connection request message and receive an RRC setup message from the wireless telecommunication network, wherein the RRC setup message includes the system flag and the time period value.

48. A device according to any one of paragraphs 45, 46 or 47, wherein the transceiver unit is configured to receive, from the wireless telecommunication network, an RRC release message and in response to the RRC release message, the processor unit is configured to transition to the first mode of operation.

49. A device according to any one of paragraphs 45 to 48, wherein when the terminal device is operating in the second mode of the mode transition state, the transceiver unit is configured to receive, from the wireless telecommunications network, a second flag indicating that in response to the next RRC release message, the processing unit will be configured to leave the mode transition state.

50. A device according to paragraph 49 wherein the transceiver unit is configured to send a random access message and receive from the wireless telecommunication system a random access response message that includes the second flag.

51. A device according to paragraph 49 wherein the transceiver unit is configured to send a random access message; receive from the wireless telecommunication system a random access response message; send a radio allocation control, RRC, connection request message and receive from the wireless telecommunications system an RRC connection setup message that includes the second flag.

52. A base station for use in a wireless telecommunications system which, during a mode transition state, supports a first mode of operation where the base station does not communicate with a terminal device and a second mode of operation where the base station does communicate with the terminal device, the base station comprising:
a transceiver unit configured to communicate with the terminal device and a processor unit configured to control the transceiver unit to transition from the first mode of operation to the second mode of operation at the expiration of a time period whereby the time period is defined by the data traffic pattern to the terminal device.

53. A base station according to paragraph 52, wherein during the first mode of operation, data packets destined for the terminal device are stored within the wireless telecommunications system and the transceiver unit is configured to transmit to the terminal device those stored data packets during the second mode of operation.

54. A base station according to paragraph 53 wherein the data packets are stored in one of the base station in a storage unit, a network core or a radio access unit of the wireless telecommunications system.

55. A base station according to any one of paragraphs 52 to 54 wherein, prior to entering the mode transition state, the time period using which the processor unit is configured to control the transceiver unit is defined in the wireless telecommunications system by:
determining a number of measuring occasions at which a paging message is sent from the wireless telecommunication system to the terminal device, the paging message being sent to indicate a data packet to send to the terminal device;
measuring, at each measuring occasion, the inter-arrival time of the data packet; and
determining a range of time period values based on the inter-arrival time over the measuring occasions.

56. A base station according to paragraph 55, wherein the range for the time period is defined in accordance with a delay tolerance in communicating a data packet between the terminal device and the wireless telecommunications system such that the range of the time period complies with the constraint $$T_{trans} \leq \min\{T_{max}, 2T_{ave}, T_P/P\}$$

Where $T_{trans}$ is the time period, $T_{max}$ is the maximum delay allowed in communicating the data packet, $T_{ave}$ is the average delay in communicating the data packet, and $T_P$ is an upper bound with probability P for the delay in communicating the data packet.

57. A base station according to paragraph 55 or 56, wherein the range for the time period is defined in accordance with a probability that no data packet arrives during the first mode of operation such that the range of the time period complies with the constraint $$T_{trans} \geq -T_{int} * \ln P_{fal}$$

$T_{trans}$ is the time period, $T_{int}$ is the inter-arrival time and $P_{fal}$ is the probability that no data packet arrives during the first mode of operation.

58. A base station according to paragraph 55, 56 or 57, wherein the range for the time period is defined in accordance with a ratio of signalling per data packet that complies with the constraint $$T_{trans} \geq f^{-1}(P_k)$$

Where $T_{trans}$ is the time period, and $$P_K = 1 - \sum_{k=0}^{K-1} \frac{\exp(-\lambda T_{trans})(\lambda T_{trans})^k}{k!} = f(T_{trans});$$

where K is the minimum number of packets transmitted during the second mode of operation, and λ represents the expected number of events in a time interval in a Poisson process.

59. A base station according to any one of paragraphs 55 to 58, wherein the transceiver unit is configured to transmit a representation of a selected value for the time period, the representation being the closest integer number of maximal DRX durations in the selected value of the time period.

60. A base station according to any one of paragraphs 55 to 58, wherein the transceiver unit is configured to transmit a representation of a selected value for the time period, the representation being selected from a sequence of numbers that are powers of two, wherein the selection is closest to the integer number of maximal DRX durations in the selected value of the time period.

61. A base station according to any one of paragraphs 55 to 60 wherein the time period is calculated within one of the base station, a network core or a radio access unit.

62. A base station according to any one of paragraphs 52 to 61, prior to operating in the mode transition state, the transceiver unit is configured to:
  transmit to the terminal device a flag and the time period value; and in response to transmitting the flag, the processing unit is configured to enter the mode transition state and to control the transceiver unit to operate in the second mode of the mode transition state.

63. A base station according to paragraph 62, wherein the transceiver unit is configured to transmit a system flag and the time period value with a paging message to the terminal device.

64. A base station according to paragraph 63, wherein the transceiver unit is configured to: transmit a paging message to the terminal device; receive a random access, RA, message from the terminal device; transmit an RA response message to the terminal device; receive a radio allocation control, RRC, connection request message and transmit an RRC setup message to the terminal device, wherein the RRC setup message includes the system flag and the time period value.

65. A base station according to any one of paragraphs 62, 63 or 64 wherein the transceiver unit is configured to transmit, to the terminal device, an RRC release message and in response to the transmission of the RRC release message, the processing unit is configured to transition to the first mode of operation.

66. A base station according to any one of paragraphs 62 to 65, wherein when the base station is operating in the second mode of the mode transition state, the transceiver unit is configured to transmit, to the terminal device, a second flag indicating that in response to the next RRC release message, processing unit is configured to leave the mode transition state.

67. A base station according to paragraph 66 wherein the transceiver unit is configured to receive a random access message and to transmit to the terminal device a random access response message that includes the second flag.

68. A base station according to paragraph 67 wherein the transceiver unit is configured to receive a random access message; transmit to the terminal device a random access response message; receive a radio allocation control, RRC, connection request message and transmit to the terminal device an RRC connection setup message that includes the second flag.

69. A wireless telecommunication system comprising the terminal device according to any one of paragraphs 35 to 51 and a base station according to any one of paragraphs 52 to 68.

REFERENCES

[1] ETSI TS 122 368 V10.530 (2011-07)/3GPP TS 22.368 version 10.5.0 Release 10
[2] Holma H. and Toskala A, "LTE for UMTS OFDMA and SC-FDMA based radio access", John Wiley and Sons, 2009
[3] Ericsson, "Details of MAC DRX Control", TSG-RAN WG-2 Meeting #61, R2-080934, (Sorento, Italy, Feb. 11-14, 2008).
[4] Shantanu Kangude, "Lecture: LTE Scheduling and DRX," online at http://lyle,smu.edu/~skangude/eets8316.html.
[5] ETSI TS 136 331 V11.3.0 (2013-04)/3GPP TS 36.331 version 11.3.0 Release 11
[6] ETSI TS 136 321 V11.2.0 (2013-04)/3GPP TS 36.321 version 11.2.0 Release 11
[7] Stefania Sesia, et al. LTE The UMTS Long Term Evolution From Theory to Practice, UK: Willy, 2011.
[8] 3GPP TR36.888, "Study on provision of low-cost MTC UEs based on LTE," June 2012
[9] MIT online course, online at http://ocw.mit.edu/courses/electrical-engineering-and-computer-science/6-262-discrete-stochastic-processes-spring-2011/course-notes/MIT6_262 S11_chap02.pdf.

The invention claimed is:

1. A method of operating a terminal device in a wireless telecommunications system which, during a mode transition state, supports a radio resource control (RRC) idle state as a first mode of operation where the terminal device does not communicate with the wireless telecommunications system and an RRC connected state as a second mode of operation where the terminal device does communicate with the wireless telecommunications system, the method comprising:
  receiving a plurality of paging messages at the terminal device;
  measuring an inter-arrival time of each of the plurality of paging messages;
  determining a range of time period values based on each of the measured inter-arrival times;
  transitioning from the first mode of operation to the second mode of operation at the expiration of a time period calculated based on the determined range of time period values, a maximum delay allowed in communicating a data packet between the terminal device and the wireless telecommunications system, and a delay tolerance in communicating the data packet between the terminal device and the wireless telecommunications system such that the time period complies with the constraint $$T_{trans} \leq \min\{T_{max}, 2T_{ave}, T_P/P\}$$

where $T_{trans}$ is the time period, $T_{max}$ is the maximum delay allowed in communicating the data packet, $T_{ave}$ is an average delay in communicating the data packet over the determined range of time period values, and $T_P$ is an upper bound with probability P for the delay in communicating the data packet.

2. The method according to claim 1, comprising:
storing in the wireless telecommunications system, during the first mode of operation, data packets destined for the terminal device; and
receiving from the wireless telecommunication system those stored data packets during the second mode of operation.

3. The method according to claim 2, wherein the data packets are stored in one of a base station, a network core or a radio access unit of the wireless telecommunications system.

4. The method according to claim 1 wherein, prior to entering the mode transition state, the time period is defined in the wireless telecommunications system by a method comprising:
determining a number of measuring occasions at which a paging message is sent from the wireless telecommunication system to the terminal device, the paging message being sent to indicate a data packet to send to the terminal device;
measuring, at each measuring occasion, an elapsed time from a previous measuring occasion as the inter-arrival time of the data packet; and
determining the range of time period values based on the inter-arrival time over the measuring occasions.

5. The method according to claim 4, wherein the range for the time period is defined in accordance with a probability that no data packet arrives during the first mode of operation such that the range of the time period complies with the constraint $$T_{trans} \geq -T_{int} * \ln P_{fal}$$

$T_{trans}$ is the time period, $T_{int}$ is an inter-arrival time and $P_{fal}$ is the probability that no data packet arrives during the first mode of operation.

6. The method according to claim 4, wherein the range for the time period is defined in accordance with a ratio of signalling per data packet that complies with the constraint $$T_{trans} \geq f^{-1}(P_k)$$

Where $T_{trans}$ is the time period, and $$P_K = 1 - \sum_{k=0}^{K-1} \frac{\exp(-\lambda T_{trans})(\lambda T_{trans})^k}{k!} = f(T_{trans});$$

where K is a minimum number of packets transmitted during the second mode of operation, and λ represents an expected number of events in a time interval in a Poisson process.

7. The method according to claim 4, comprising receiving a representation of a selected value for the time period, the representation being a closest integer number of maximal DRX durations in the selected value of the time period.

8. The method according to claim 4, comprising receiving a representation of a selected value for the time period, the representation being selected from a sequence of numbers that are powers of two, wherein the selection is closest to an integer number of maximal DRX durations in the selected value of the time period.

9. The method according to claim 1 wherein the time period is calculated within one of the base station, a network core or a radio access unit.

10. The method according to claim 1, prior to operating in the mode transition state, further comprising:
receiving from the wireless telecommunications system a flag and the time period value; and
in response to the flag, entering the mode transition state and operating in the second mode of the mode transition state.

11. The method according to claim 10, wherein the system flag and the time period value is sent with a paging message from the wireless telecommunication network.

12. A method according to claim 10, comprising:
receiving a paging message from the wireless telecommunication network;
sending a random access (RA) message to the wireless telecommunication network;
receiving an RA response message from the wireless telecommunication network;
sending a radio allocation control, RRC, connection request message and receiving an RRC setup message from the wireless telecommunication network, wherein the RRC setup message includes the system flag and the time period value.

13. The method according to claim 10 comprising receiving, from the wireless telecommunication network, an RRC release message and in response to the RRC release message, transitioning to the first mode of operation.

14. The method according to claim 10, wherein when the terminal device is operating in the second mode of the mode transition state, the method further comprises receiving, from the wireless telecommunications network, a second flag indicating that in response to a next RRC release message, the terminal device will leave the mode transition state.

15. The method according to claim 14 comprising sending a random access message and receiving from the wireless telecommunication system a random access response message that includes the second flag.

16. The method according to claim 14 comprising:
sending a random access message;
receiving from the wireless telecommunication system a random access response message;
sending a radio allocation control, RRC, connection request message and receiving from the wireless telecommunications system an RRC connection setup message that includes the second flag.

17. A method of operating a base station in a wireless telecommunications system which, during a mode transition state, supports a radio resource control (RRC) idle state as a first mode of operation where the base station does not communicate with the terminal device and an RRC connected state as a second mode of operation where the base station does communicate with the terminal device, the method comprising:
transmitting a plurality of paging messages to the terminal device;
measuring an inter-arrival time of each of the plurality of paging messages;
determining a range of time period values based on each of the measured inter-arrival times;
transitioning from the first mode of operation to the second mode of operation at the expiration of a time period calculated based on the determined range of time period values, a maximum delay allowed in communicating a data packet between the terminal device and the wireless telecommunications system, and a delay tolerance in communicating the data packet between the terminal device and the wireless telecommunications system such that the time period complies with the constraint $$T_{trans} \leq \min\{T_{max}, 2T_{ave}, T_P/P\}$$

where $T_{trans}$ is the time period, $T_{max}$ is the maximum delay allowed in communicating the data packet, $T_{ave}$ is an average delay in communicating the data packet over the determined range of time period values, and $T_P$ is an upper bound with probability P for the delay in communicating the data packet.

18. The method according to claim 17, comprising:
storing in the wireless telecommunications system, during the first mode of operation, data packets destined for the terminal device; and
transmitting to the terminal device those stored data packets during the second mode of operation.

19. A terminal device for use in a wireless telecommunications system which, during a mode transition state, supports a radio resource control (RRC) idle state as a first mode of operation where the terminal device does not communicate with the wireless telecommunications system and an RRC connected state as a second mode of operation where the terminal device does communicate with the wireless telecommunications system, the terminal device comprising:

a transceiver configured to communicate with the wireless telecommunications system and receive a plurality of paging messages;
processing circuitry configured to measure an inter-arrival time of each of the plurality of paging messages;
the processing circuitry further configured to determine a range of time period values based on each of the measured inter-arrival times; and
the processing circuitry further configured to control the transceiver to transition from the first mode of operation to the second mode of operation at the expiration of a time period calculated based on the determined range of time period values, a maximum delay allowed in communicating a data packet between the terminal device and the wireless telecommunications system, and a delay tolerance in communicating the data packet between the terminal device and the wireless telecommunications system such that the time period complies with the constraint $$T_{trans} \leq \min\{T_{max}, 2T_{ave}, T_P/P\}$$

where $T_{trans}$ is the time period, $T_{max}$ is the maximum delay allowed in communicating the data packet, $T_{ave}$ is an average delay in communicating the data packet over the determined range of time period values, and $T_P$ is an upper bound with probability P for the delay in communicating the data packet.

* * * * *